(12) United States Patent
Rasmussen

(10) Patent No.: US 7,901,758 B2
(45) Date of Patent: Mar. 8, 2011

(54) LAMINATES OF FILMS HAVING IMPROVED RESISTANCE TO BENDING IN ALL DIRECTIONS AND METHODS AND APPARATUS FOR THEIR MANUFACTURE

(76) Inventor: Ole-Bendt Rasmussen, Walchwil (CH)

( * ) Notice: Subject to any disclaimer, the term of this patent is extended or adjusted under 35 U.S.C. 154(b) by 1102 days.

(21) Appl. No.: 10/538,224

(22) PCT Filed: Dec. 9, 2003

(86) PCT No.: PCT/EP03/15001
§ 371 (c)(1),
(2), (4) Date: Nov. 7, 2005

(87) PCT Pub. No.: WO2004/054793
PCT Pub. Date: Jul. 1, 2004

(65) Prior Publication Data
US 2007/0257402 A1    Nov. 8, 2007

(30) Foreign Application Priority Data

Dec. 13, 2002  (GB) .................................. 0229110.2
Feb. 28, 2003  (GB) .................................. 0304649.7
Aug. 26, 2003  (GB) .................................. 0319955.1

(51) Int. Cl.
B32B 1/00    (2006.01)
B32B 3/12    (2006.01)
B32B 3/28    (2006.01)
B32B 3/30    (2006.01)
B32B 3/20    (2006.01)
B32B 27/14   (2006.01)

(52) U.S. Cl. ......... 428/174; 428/166; 428/182; 428/184; 428/186; 428/198; 428/178; 428/188

(58) Field of Classification Search .................. 428/182, 428/183, 184, 185, 186, 198, 166, 156, 174, 428/178
See application file for complete search history.

(56) References Cited

U.S. PATENT DOCUMENTS
3,649,431 A * 3/1972 Parker ........................... 428/137
(Continued)

FOREIGN PATENT DOCUMENTS
EP    0624126 B    11/1994
(Continued)

OTHER PUBLICATIONS
PCT International Search Report, Apr. 2004.

Primary Examiner — David R Sample
Assistant Examiner — Catherine Simone
(74) Attorney, Agent, or Firm — Robert W Strozier

(57) ABSTRACT

The present invention relates to a flexible laminate of films of thermoplastic polymer material mainly for applications in which relatively high yield strength and ultimate tensile strength is required, and a method and apparatus for its manufacture. The laminate comprises a monofilm formed or multifilm-formed ply (A) and another monofilm-formed or multifilm formed ply (B) both mainly consisting of orientable thermoplastic polymer material, in which A has a fluted configuration and B on a first side is adhesively bonded in bonding zones to the crests on a first side of A, in which B also has a fluted configuration, the flute direction of B forming an angle from generally about 30° up to and including 90° to the flute direction of A and the said bonding zones being on the crests of the first side of B to produce spot bonding with the crests on the first side of A, the wavelengths of the flutes in A and/or B are no longer than 5 mm, and the wavelengths of the flutes in both A and B are less than 10 mm.

53 Claims, 8 Drawing Sheets

U.S. PATENT DOCUMENTS

| | | | | |
|---|---|---|---|---|
| 3,954,933 | A | 5/1976 | Rasmussen | |
| 4,039,364 | A | 8/1977 | Rasmussen | |
| 4,084,028 | A | 4/1978 | Rasmussen | |
| 4,115,502 | A | 9/1978 | Rasmussen | |
| 4,125,581 | A | 11/1978 | Rasmussen | |
| 4,132,581 | A | 1/1979 | Swartz | |
| 4,143,195 | A | 3/1979 | Rasmussen | |
| 4,207,045 | A | 6/1980 | Rasmussen | |
| 4,229,394 | A | 10/1980 | Rasmussen | |
| 4,293,294 | A | 10/1981 | Rasmussen | |
| 4,294,638 | A | 10/1981 | Rasmussen | |
| 4,368,017 | A | 1/1983 | Rasmussen | |
| 4,377,544 | A | 3/1983 | Rasmussen | |
| 4,403,934 | A | 9/1983 | Rasmussen | |
| 4,407,877 | A | 10/1983 | Rasmussen | |
| 4,420,451 | A | 12/1983 | Rasmussen | |
| 4,421,810 | A | 12/1983 | Rasmussen | |
| 4,422,837 | A | 12/1983 | Rasmussen | |
| 4,430,284 | A | 2/1984 | Rasmussen | |
| 4,436,568 | A | 3/1984 | Rasmussen | |
| 4,440,709 | A | 4/1984 | Rasmussen | |
| 4,465,724 | A | 8/1984 | Rasmussen | |
| 4,492,549 | A | 1/1985 | Rasmussen | |
| 4,588,631 | A * | 5/1986 | Clark | 428/166 |
| 4,629,525 | A | 12/1986 | Rasmussen | |
| 4,636,417 | A | 1/1987 | Rasmussen | |
| 4,767,488 | A | 8/1988 | Rasmussen | |
| 4,793,885 | A | 12/1988 | Rasmussen | |
| 4,874,653 | A | 10/1989 | Rasmussen | |
| 4,908,253 | A | 3/1990 | Rasmussen | |
| 5,028,289 | A | 7/1991 | Rasmussen | |
| 5,205,650 | A | 4/1993 | Rasmussen | |
| 5,248,366 | A | 9/1993 | Rasmussen | |
| 5,330,133 | A | 7/1994 | Rasmussen | |
| 5,361,469 | A | 11/1994 | Rasmussen | |
| 5,626,944 | A * | 5/1997 | Rasmussen | 428/172 |
| 6,344,258 | B1 | 2/2002 | Rasmussen | |
| 6,787,206 | B2 | 9/2004 | Rasmussen | |
| 6,887,503 | B1 | 5/2005 | Rasmussen | |
| 7,001,547 | B2 | 2/2006 | Rasmussen | |
| 7,132,151 | B2 | 11/2006 | Rasmussen | |
| 2004/0070105 | A1 | 4/2004 | Rasmussen | |
| 2004/0247730 | A1 | 12/2004 | Rasmussen | |
| 2005/0095411 | A1 | 5/2005 | Rasmussen | |
| 2005/0118304 | A1 | 6/2005 | Rasmussen | |
| 2007/0082188 | A1 | 4/2007 | Rasmussen | |
| 2007/0254120 | A1 | 11/2007 | Rasmussen | |
| 2007/0257402 | A1 | 11/2007 | Rasmussen | |
| 2007/0290416 | A1 | 12/2007 | Rasmussen | |
| 2008/0035714 | A1 | 2/2008 | Rasmussen | |
| 2009/0206510 | A1 | 8/2009 | Rasmussen | |
| 2009/0233041 | A1 | 9/2009 | Rasmussen | |

FOREIGN PATENT DOCUMENTS

| | | |
|---|---|---|
| JP | S34-4152UB | 3/1959 |
| JP | H02-133331 U | 11/1990 |
| WO | WO02/102592 A | 12/2002 |

* cited by examiner

US 7,901,758 B2

LAMINATES OF FILMS HAVING IMPROVED RESISTANCE TO BENDING IN ALL DIRECTIONS AND METHODS AND APPARATUS FOR THEIR MANUFACTURE

FIELD OF THE INVENTION

The present invention relates to a flexible laminate of films from thermoplastic polymer material mainly for applications in which relatively high yield strength and ultimate tensile strength is required, and a method and apparatus for its manufacture. In special aspect it also relates to film laminates which allow air but not water to penetrate, and laminates with properties as filter material. Examples of applications are: tarpaulins and cover-sheets, pond liners, substitute geotextiles, weather or gas protective garments, greenhouse film, industrial bags or garbage bags, carrier bags, self-standing pouches, and sanitary backsheets.

DESCRIPTION OF RELATED ART

For economical reasons there is an increased need to reduce the square meter weight of flexible film made from thermoplastic polymer material. The limits are partly set by the required film properties, and partly by the required self supporting capability, i.e. stiffness or resilience with respect to bending. These needs have mainly been met by selected developments of the thermoplastic polymer compositions and as far as the strength is concerned also by biaxial orientation, or by crosslamination of films each of which exhibits a generally monoaxial or unbalanced biaxial unorientation. From the strength point of view essential savings can be achieved by such orientation and/or crosslamination processes.

Thus as an example an industrial bag made from extruded polyethylene film of the best suited grades and destined for packing of 25 kg polyethylene granules must generally have a thickness of 0.12-0.15 mm in order to satisfy the normal strength requirements, while this thickness can be brought down to about 0.07 mm by use of optimized oriented and crosslaminated film from polyethylene. However, when this crosslaminate is made in the known manner, few available types of machines for manufacturing bags from film, and few available types of machines for filling the bags, can work adequately with film which is so thin and flimsy.

A crosslaminate which, besides the improved strength properties obtained by the orientation and crosslamination, also by virtue of its geometrical structure shows significant improvements in this respect, is described in the inventor's earlier specification EP-A-0624126.

This is a crosslaminate of a slightly waved configuration in which the material in the curved crests on one or both sides of the laminate is thicker than elsewhere, the material between these thicker curved crests being generally straightened out. (See FIGS. 1 and 2 of said patent publication). The structure is obtained by stretching between several sets of grooved rollers under special conditions. This stretching also imparts transverse orientation. The disclosed wavelengths of the final product are between 2.2 and 3.1 mm.

Crosslaminates according to EP-A-0624126 have been produced industrially since 1995 for manufacture of industrial bags from combinations of high molecular weight high density polyethylene (HMWHDPE) and linear low density polyethylene (LLDPE) with film weight about 90 gm$^{-2}$. The slightly waved shape in combination with the thickened crests imparts a stiffness and resilience in one direction of the film which has proven to be very important for the performance of the bag machines with such relatively thin film. However a film of a similar structure, but with a 70 gm$^{-2}$ gauge, which satisfies the strength requirements is too flimsy for the making of bags.

As another example an agricultural tarpaulin (e.g. for protection of crops) made from a 70 gm$^{-2}$ crosslaminate of oriented polyethylene films would be a fully adequate substitute for a 100 gm$^{-2}$ tarpaulin made from extrusion-coated woven tape, if only objective criteria were applied. However, the average customer of agricultural tarpaulins makes his choice to a great extent on the basis of the handle and the appearance, and will reject the 70 gm$^{-2}$ tarpaulin due to its flimsiness, judging that it lacks substance.

The stiffness can of course always be increased by suitable incorporation of a filler, (and the present invention includes that as an additional option) but this will always more or less be at the expense of puncture and tear propagation resistance, especially under impact.

OBJECT OF THE INVENTION

An object of the present invention is to add a "feel of substance" and improve the stiffness or resilience of the film in all directions, without sacrificing the laminate's character of feeling and looking like a generally two-dimensional structure, and without essentially harming the puncture and tear propagation resistance.

SUMMARY OF THE INVENTION

The basic idea behind the present invention is to apply the corrugated paperboard principle to laminates of thermoplastic films, but preferably in such a way that the flute structure is especially fine ("minifluted"), so as to obtain a laminate which, in spite of the structurally increased stiffness, can satisfy the above mentioned conditions. It is an essential feature of the product of the invention that there are flutes in two different plies, with the flute directions crisscrossing to give all directions of the laminate increased stiffness or resilience.

More precisely the product of this aspect of the invention is specified in as a laminate comprising a monofilm-formed or multifilm-formed ply (A) and another monofilm-formed or multifilm-formed ply (B) both mainly consisting of orientable thermoplastic polymer material, in which A has a fluted configuration and B on a first side is adhesively bonded in bonding zones to the crests on a first side of A, characterized in that a) B also has a fluted configuration, the flute direction of B forming an angle from aenerally about 30° up to and including 90° to the flute direction of A and the said bonding zones being on the crests of the first side of B to produce spot bonding with the crests on the first side of A, b) the adhesive bonding is i) directly A to B and established through a lamination layer on A and/or B; ii) established through a separate thin bonding film; or iii) through a fibrous web adapted for bonding, and c) the wavelengths of the flutes in A and/or B are no longer than 5 mm, and the wavelengths of the flutes in both A and B are less than 10 mm. Preferably the wavelengths of the flutes in each of the plies are no more than 5 mm.

While I have identified the laminate as comprising the plies A and B, each ply can consist of one or more films, normally extruded films, and each extruded film can and normally will consist of several coextruded layers.

In itself the application of the corrugated paperboard principle to thermoplastic film material is not new, but in the prior art this is done by laminating a fluted film to a flat film. Furthermore the finest flute structure which has been disclosed in patent literature, namely in U.S. Pat. No. 4,132,581 col. 6, ln. 66 is 50 +/−3 flutes per foot corresponding to a wavelength of about 6.0 mm. It is very doubtful that a wavelength lower than this can be achieved by the method disclosed in this patent, in which the first bonding process takes place by the use of a row of many sealer bars supported and transported by a belt. The sealer bars are transverse to the direction of movement (the machine direction) so the fluting also becomes perpendicular to this direction. The use of the method is stated to be manufacture of board material, and the thickness of the fluted ply is indicated to be about 0.004-0.025 inches (0.10-0.625 mm). In the example it is 0.018 inches (0.45 mm).

Other patents dealing with the use of the corrugated paperboard principle to thermoplastic film for the making of panels or boards are U.S. Pat. Nos. 3,682,736, 3,833,440, 3,837,973, EP-A-0325780 and WO-A-94/05498.

JP-A-02-052732 discloses laminates consisting of a corrugated thermoplastic film bonded to a flat thermoplastic film, which on its other side is bonded to paper. The paper and flat sheet are first joined and then the corrugated film is added. The flutes, which also in this case are perpendicular to the machine direction, are pressed flat and adhesively closed at intervals so that a large number of airtight vesicles are formed. The stated use of this product is for cushion material, sound-insulating material, heat- and moisture-insulating material and wall decorative material. The thicknesses of the corrugated sheet and flat sheet are not indicated, neither are the wavelength of the fluting and the length of the vesicles.

The inventor of the present invention has found that special constructions of the corrugator/laminator generally is needed in order to make the miniflutes, since if the pitch is low on the gear rollers which produce the fluting and the lamination, the corrugated film will tend to jump out of the grooves in the forming and laminating roller during its passage from the location where the forming of flutes takes place to the location where the bonding takes place. In a conventional corrugator for manufacture of corrugated paperboard there are provided tracks or shields to hold the fluted paper in the grooves. At ambient temperature this allows the paper to be more readily permanently formed. Similar tracks or shields in unmodified form cannot be used with thermoplastic film under production conditions since friction against the track or shield quickly would create congestion by heating of the polymer.

An improved, frictionless way of holding of flutes of paper in the grooves of a roller is known from U.S. Pat. No. 6,139,938, namely by maintaining a controlled underpressure within the grooves (see FIGS. 9 and 10 and col. 7 lines 25-34). This US patent deals entirely with corrugated paper laminates having particularly low wavelength, while manufacture of corrugated structures from thermoplastic films is not mentioned. However, the improved method of holding the flutes will in fact also, depending on the film thickness, be applicable to fine flutes in thermoplastic film. This was implemented in connection with the development of the present invention.

The present development of the particularly fine flute structure can be expected to make the corrugated paperboard principle applicable to completely different fields of use such as the fields mentioned at the very beginning of this specification.

This has comprised a development of new types of machinery based on grooved rollers with a very fine pitch. As it will appear from example 1 the wavelength in each ply of a 90 $gm^{-2}$ minifluted 2-ply laminate has in actual fact been brought down to 1.0 mm through a process which can be carried out industrially. Especially by use of after-shrinkage it can probably be brought further down e.g. to about 0.5 mm. The mentioned 90 $gm^{-2}$ gauge corresponds to an average thickness of about 0.096 mm if the laminate were pressed flat with equal thickness all over.

The invention is not limited to gauges corresponding to pressed-flat thicknesses around this value, but also comprises, very generally speaking, minifluted laminates of an average thickness in compacted form which is roughly about 0.3 mm or lower. Thicknesses down to about 0.03 mm or even lower can be made for special purposes, such as for instance backsheets on napkins (diapers).

Nor is the invention limited to the use in connection with crosslaminates of oriented films. For different purposes different combinations of strength properties are required. Crosslaminates can, as is known, be produced with suitable combinations of several categories of strength properties but for many purposes other types of strength laminates may be preferable when the cost of the manufacturing process also is considered, and the present invention can also be useful in such other strength laminates as further specified below.

By making the wavelength as low as about 5 mm or less, the laminate loses—gradually with the reduction of wavelength—its character of being a board material and develops the appearance, handle and bending properties of a resilient flexible film. It also gets improved puncture and tear properties, relative to its weight. Compared to non-corrugated laminates of the same composition and same square weight it feels much more substantial due to the increased stiffness and resilience in all directions and due to the increased volume.

In the case of crosslaminates it is well known that a weak bonding between the plies, or strong spot-bonding or line-bonding, gives very improved tear propagation resistance, since it allows the tear to proceed in different directions in the different plies. Thereby the notch effect is reduced. Since a crosslaminate with both plies corrugated will be spot-bonded, it will show improved tear propagation resistance, no matter whether the wavelength is short or long, but minifluting makes the tear stop after a very short propagation, which of course is very advantageous in most cases. However, the improvements in tear propagation resistance, is a result not only of the spot-bonding, but also of the fluted form of each ply, which gives the ply better possibilities of changing orientation or fibrillating during the tearing, thereby absorbing energy. This is a kind of buffer effect.

When laminates according to the present invention are used for textile or textile-like application there is the additional advantage that the structure with crisscrossing miniflutes, due to a smoothing influence when the laminate is given creases, reduces the rustle, or makes the tone of rustle deeper. This adds to the impression that the laminate is a kind of textile. This feature has special importance in applications as a garment for people or animals, e.g. weather protective or gas protective garments, then rustle is felt irritating and disadvantageous in some uses. It should hereby be mentioned that crosslaminates according to the inventor's earlier patents, with a barrier layer included, has found application in several countries for gas protective garments, but due to the rustle did not succeed against competition. It is believed that this problem will be fully solved by use of the present invention.

It is also found that the special structure comprising fluted, mutually spot bonded plies, with the flutes criss-crossing, provides the laminate with some diagonal give like that of woven fabrics, although less than in woven fabrics, and very dependent on the depth of the flutes and of the coefficient of elasticity (E). This property enhances the ability of the laminate to fit with objects which it covers or encases. Heat insulating properties due to the miniflutes also help to give the laminate a textile-like character.

The inventor of the present invention has also filed an earlier, simultaneously pending WO-A-0202592 which was not published on the first priority date of the present invention. The two inventions are closely related, however the product claims of the earlier application concern a laminate of which a minifluted ply is laminated on one or both surfaces to a non-fluted (flat) ply, or a non-fluted (flat) ply is laminated on one or both surfaces to a "minifluted" ply. Contrary to this, it should be emphasized that in the present invention two fluted plies with different direction of the flutes are directly bonded together crests to crests, for instance through a lamination layer. Thus the structure of the old invention can be considered like a multitude of fine pipes bonded together, while the spotbonded structure of the present invention has a more flexible but resilient character. It allows a deeper bending without causing permanent deformations, and is also the reason for the above mentioned tendency to some textile-like diagonal give.

If two laminates according to the old invention, each consisting of one minifluted ply and one flat ply, are bonded together flat ply to flat ply, with the two directions of flutes perpendicular to each other, the resultant 4-ply will not exhibit properties like those of the present invention, since the two fluted plies are not directly bonded together in a spot-bonded arrangement crests to crests. The flat in-between ply works against flexibility and resilience.

In the present invention the direct bonding crests to crests through a lamination layer will normally best be effected through a lower melting surface layer on at least one of the plies, formed in a coextrusion process. However, as stated in the claims, it is also possible to use a separate thin bonding film. This is preferably done by extrusion lamination, which will not harm the above mentioned textile-like behaviours, provided the lamination layer extruded in such procedure is so thin that it does not essentially influence the diagonal give, flexibility and resilience of the laminate. The use of a fibrous web adapted for the bonding can also be suitable.

For the sake of good order, it should be mentioned that there already have been described minifluted laminates in literature, however these disclosures concern laminates of which the fluted ply consists of a material which is not a thermoplastic film nor an assembly of thermoplastic films, and apart from this the inventor has not found any disclosure of two fluted plies in criss-crossing arrangement, neither consisting of thermoplastic nor of any other material.

U.S. Pat. No. 6,139,938, which has been mentioned above, has for its object a 3-ply paper laminate with a corrugated paper sheet in the middle and flat paper sheets on each side, like normal corrugated paper board, however claimed to comprise 500-600 flutes per meter corresponding to a wavelength of 1.67-2.00 mm. The stated purpose is to improve the printability.

JP-A-07-251004 relates to an absorbing product in which a plane thermoplastic synthetic fibre sheet is thermally bonded to a corrugated sheet mainly consisting of active carbon fibres. The wavelength of the corrugation is 2.5-20 mm.

JP-A-08-299385 relates to an absorbent laminate consisting of a fluted non-woven fabric bonded on one side to a plane sheet or film, which can be a thermoplastic film. Between these two plies is nested a water-absorbing material. The wavelength is claimed to be 3-50 mm, and it is stated that there would not be sufficient space for the absorbing material if it were less. The product is for diapers and similar products.

The method of making the present corrugated laminate of two monofilm-formed or multifilm-formed plies is defined in as a method of manufacturing a laminate of a first monofilm-formed or multifilm-formed ply with a second monofilm-forme or multifilm-formed ply both mainly consisting of orientable thermoplastic polymer material, in which the first ply has a waved flute configuration, and the second ply on a first side is adhesively bonded in bonding zones to the crests on a first side of A, in which further the waved flute structure of the first ply is formed by the use of a grooved roller, and the said bonding with the second ply is carried out under heat and pressure and also under use of a grooved roller, characterized in that a) the second ply also is given a waved configuration, whereby under use of at least one grooved roller the flute direction of the second ply is made at an angle to the flute direction of the first ply and the said bonding zones are established on the crests of the first side of the second ply to introduce spot bonding with the crests on the first side of the first ply, b) the adhesive bonding i) is directly first to second ply and established through a lamination layer on at least one of these plies; ii) established through a separate thin bonding film; or iii) established through a fibrous web adapted to the bonding; and c) the wavelengths of the flutes in both plies are no longer than 10 mm, and the wavelengths of the flutes in at least one of the plies are no longer than 5 mm. Preferably the main direction in which the flutes of one of the plies extends is generally substantially perpendicular to the main direction in which the flutes of the other ply extends. As it will appear from explanations below, the flutes are not always strictly rectilinear, and therefore the expression "main direction" is used. Preferably one of the flute directions essentially coincide with the machine direction of the lamination.

Thus the waved flute structure in one of the plies can be established essentially in the machine direction in a generally transverse orientation process by taking the ply before lamination through a set of driven mutually intermeshing grooved rollers, whereby the grooves on the rollers are circular or helical and form an angle of at least 60° with the roller axis.

In this procedure the ply may be passed directly from its exit from one of the grooved stretching rollers which flute the ply to the grooved lamination roller, while these two grooved rollers are in close proximity to each other, have grooves of the same pitch when measured at the respective operational temperature, and are mutually adjusted in the axial direction. A preferable modification of this routing, namely the introduction of "attenuated zones", is mentioned below.

In another procedure the fluted structure in one of the plies can be established essentially perpendicularly to the machine direction by means of rollers in which the grooves are essentially parallel with the roller axis, as normal when making corrugated paper board. The two procedures are conveniently combined, so that before the lamination one ply is supplied with essentially longitudinal flutes, and the other ply is supplied with essentially transverse flutes, and the lamination rollers are supplied with grooves, one with the grooves essentially in the machine direction, the other with its grooves essentially perpendicular to this, and the procedure is adapted so that the preformed generally longitudinal flutes will fit into the generally longitudinal grooves in one lamination roller, while the preformed transverse flutes will fit into the transverse grooves in the other lamination roller. One of the lamination rollers should normally be a rubber roller. After the lamination the flutes in one or each ply can be made deeper by shrinkage of the other ply in the appropriate direction. This of course depends on orientation in at least one of the plies generally in the same direction as the direction of its flutes.

In a simplified procedure, which however generally makes the flutes in one of the plies more shallow, only one ply is supplied with flutes prior to the lamination. Both lamination rollers normally have grooves (but some exceptions will be mentioned later), one roller made so that the preformed flutes in one ply will fit into its grooves, and the other made so that its grooves are generally perpendicular to this direction. Thus the laminate becomes spot-bonded, and when the fluted ply subsequently is caused to shrink along the direction of its flutes (which depends on the ply having orientation in this direction) the flat ply will buckle up, forming flutes generally perpendicular to the preformed flute. As mentioned above usually this will produce relatively shallow flutes in the originally flat ply.

While the angle between the flutes in ply A and the flutes in ply B should be generally about 30° or more, it is better to make it generally about 60° or more, and usually best to make it generally about 90°.

Suitable dimensions in the laminate and divisions on the laminating rollers are stated in the product as laminates: characterized in that the flute wavelength in each of the two plies is no more than 4 mm, preferably no more than 3 mm and still more preferably no more than 2 mm; characterized in that in each of the two plies the curved length of a flute is on average at least 5% and preferably at least 10% longer than the linear wavelength, the curved length being understood as the length of a curve through the cross section of a full flute wave including the bonding zone which curve lies in the middle between the two surfaces of the ply; characterized in that in at least one of said plies the said average is at least 15%; characterized in that the width of each bonding zone in at least one of the two plies is no less than 15%, preferably no less than 20%, and still more preferably no less than 30% of the flute wavelength and in method as a method characterized in that the pitch of the grooved roller, which produces the lamination on the crests is at the highest 3.0 mm, preferably no more than 2.0 mm and still more preferably no more than 1.5 mm and in apparatus as apparatus in which the land on the crest of the or each grooved laminating roller is at least 15%, preferably at least 20%, more preferably at least 30% of the pitch of the grooved of that roller; comprises a grooved roller for fluting a first ply of thermoplastic polymer material, a grooved roller for fluting a second ply of thermoplastic polymer material, means for directing the first and second plies from their respective grooved rollers between a set of laminating devices with the plies arranged in face to face contact with one another and with the flutes of the first ply generally directed at an angle to the flutes of the second ply, the set of laminating devices, comprising, on the side facing the second ply, a heated porous bar and on the side facing the first ply, an opposite laminating device, wherein said porous bar is adapted to produce a film of hot air to press the plies towards the opposite laminating device and bond the plies together at the crests of the flutes of the second 10 ply to form a laminate, and the opposite laminating device is a roller or a porous bar, the grooved fluting rollers having groove pitches such that in the laminate the plies each have flutes of wavelength less than 10 mm and the flutes of at least one of the plies have a wavelength no longer than 5 mm. Cross-sectional dimensions are measured on micrographs.

With reference to FIGS. 2 and 3, the lengths, characterized in that in each of the two plies the curved length of a flute is on average at least 5% and preferably at least 10% longer than the linear wavelength, the curved length being understood as the length of a curve through the cross section of a full flute wave including the bonding zone which curve lies in the middle between the two surfaces of the ply, are distances from X to Z one following the curved route through the middle of A, the other the direct, linear route.

For the textile-like applications the flute wavelength should preferably be as low as practically possible in both plies, having hereby also regard to the economy of the manufacturing process, this means generally about 1-1.5 mm, while for applications in stiff products like small boxes or selfstanding pouches, it should preferably be similarly low on the side which is the outside in the final product, and which possibly must be printed, but should preferably be higher on the side which is the inside in the final product. When the flute wavelength is about 1 mm, the quality of print can be reasonably good.

The fluted plies should normally consist of material which is orientable at room temperature and then suitable polymers are polyolefins. However, there are cases in which there is no special advantage in such properties, thus e.g. polystyrene will be suitable for stiff sheet material applicable for conversion to small boxes or selfstanding pouches if there is little need for high strength.

At least one of the plies may comprise a barrier film, e.g. for protection against oxygen or, as already mentioned, against harmful substances, such as gaseous substances.

When flutes are formed by means of grooved rollers prior to the lamination they will become evenly formed and extend in a generally rectilinear fashion. However, when the grooves are formed entirely by shrinkage after the lamination, their shape will be determined by the pattern of grooves in the lamination roller contacting the flat ply and the degree of shrinkage of the shrinkable ply. This can of course also be an even rectilinear pattern, but in order to obtain aesthetic or interesting visual effects, the pattern of the flutes in this ply can be different. Thus although the flutes must extend mainly along the direction which is generally perpendicular to the flute direction in the other ply, they can nevertheless be made curved or zig-zagging and/or branched by an appropriate shaping of the pattern of grooves in the lamination roller (normally a rubber roller) which this ply contacts, or they can be made differently shaped in a pattern which gives a visual effect showing a name, text, logo or similar. Such patterns in the lamination roller can be made by methods known from rubber stereography.

For the sake of completeness it should also be mentioned that waved, partly branching and partly interrupted flutes in one ply also can be formed spontaneously and at random under use of a smooth lamination roller, namely when the bonding strength is suitably adjusted to allow partial delamination during shrinkage of the other ply. Such surface structure looks like naturally wrinkled skin or leather. There can also be achieved interesting visual effects by making, a part of the mentioned lamination roller smooth and a part supplied with grooves, in a suitable pattern. The above mentioned marking, showing a name, text, logo or similar can for instance be made in this way.

Such interesting visual effects and/or appearance of the laminate as textile-like, can be enhanced when at least one of the two plies has a metallic or iridescent gloss or where the two plies are given different colours.

For most applications it is highly preferable that either the thickness of each of the said plies is generally the same in bonded and unbonded zones, or at least one ply exhibits solid-state attenuated zones, in the following referred to as the "first" such zones, formed by a so-called "segmental stretching", and extending parallel to the flute direction, each bonding zone mainly being located within such a first attenuated zone. Herein each first attenuated zone is understood as delimited by the positions where the thickness is an average between the minimum thickness of this ply within the first attenuated zone and the ply's maximum thickness within the adjacent non-bonded zone. The method of making the fluted laminate with such first solid-state attenuated zones located as mentioned requires a strict coordination between stretching rollers and lamination rollers, and is specified: as a method characterized in that prior to the said bonding process at least one of said plies is solid-state stretched in narrow zones to form first attenuated zones which are parallel to the selected direction of fluting in the ply, said stretching being generally perpendicular to the said direction and carried out between a set of grooved rollers both different from the grooved roller for lamination, and that the grooved roller for lamination is coordinated with the said set of grooved rollers for stretching in such a way that each zone of bonding mainly becomes located within a first attenuated zone; as a method characterized in that a suitably distinct stripe formation of the first attenuated zone is established at least in part by giving the crests on the grooved stretching roller intended to produce the stripes a temperature which is higher than the temperature on the crests on the other grooved stretching roller and/or by giving the crests on the grooved stretching roller intended to produce the stripes a radius of curvature which is smaller than the radius of curvature of the crests on the matching grooved stretching roller; as an apparatus comprising a first set of grooved stretching rollers upstream from the laminating station for at least one of the plies, which stretches the material of the respective ply in a solid state and in a direction generally perpendicular to the flutes to form first attenuated zones, wherein the grooved stretching rollers, grooved fluting rollers and grooved laminating rollers are coordinated so that the first attenuated zones become the crests of the flutes and the bonding zones are mainly located within first attenuated zones; as an apparatus in which the last of the grooved stretching rollers is in close proximity to the grooved laminating roller and the grooves of each are of the same pitch at the operating temperature of the apparatus and being aligned; and as an apparatus which comprises one or a series of heated grooved transfer rollers located between the last of the grooved stretching rollers and the grooved laminating roller, adjacent rollers being close together, the grooves of the stretching, transfer and laminating rollers having the same pitch at the operating temperature of the apparatus and being aligned with one another.

In this connection, an essential attenuation of a ply in the non-bonded zones, as compared to the thickness in the bonded zones, will of course have a negative-influence on the resistance to bending and the resilience, but it is generally easier to make the fluted laminate so. By contrast this resistance to bending is enhanced in comparison with the situation when the thickness is even, when there are attenuated zones and each bonding zone mainly falls within one of these attenuated zones. The attenuated zones in at least one of the plies also facilitate the manufacturing process as it later shall be explained. It is noted that while attenuation by stretching in solid molten state reduces the tensile strength, attenuation by stretching in the solid state can increase the tensile strength in the direction in which the stretching has taken place.

The first attenuated zones are shown as (6) in FIGS. 2 and 3. They are here shown as almost exactly coinciding with the zones of bonding in the sections shown, which are sections drawn through the bonded spots. However, they need not be coincident like this, since the requirement only is that each bonding zone mainly is located within a first solid-state attenuated zone. Thus, the bonding zones can to some degree extend beyond the first attenuated zones, or the latter can extend beyond the former. Preferable choices of relative zone widths for the last case are specified as a laminate in which first attenuated zones are present in at least one of the plies and in which the bonding zones are generally coincident with the first attenuated zones.

Of course such extension of the first attenuated zones into non-bonded zones will reduce the stiffness, but will normally not reduce the resilience. It may even increase this property and will add to the textile-like character. It can with a suitable choice of other conditions, also provide the laminate with a higher tear propagation resistance and higher impact strength.

When at least one of the plies exhibits solid-state attenuated zones, the first attenuated zones of the ply are preferably attenuated to such extent that the minimum thickness in such zone is less than 75% of the maximum thickness of the ply in the non-bonded zone. preferably less than 50% and more preferably less than 30% of that maximum thickness.

A suitable method of achieving almost precise correspondence of the first attenuated zones with the bonding zones, at least in one ply, is to adjust the roller temperatures to the thickness of the attenuated zones, at least in on ply, is to adjust the roller temperatures to the thickness of the attenuated zones and to the velocity of the plies, in such a way that these zones reach a temperature which makes them laminate adequately to the other ply, while the film material outside the zones due to its thickness does not reach a sufficient temperature. A condition is that the flat crests on the grooved lamination roller are wider than and extend beyond each of the "first attenuated zones". This is defined: as a laminate in which first attenuated zones are present in at least one of the plies and in which the bonding zones are generally coincident with the first attenuated zones; a method in which the lamination layer is heated to the lamination temperature by heating from the opposite side of the ply, and in which the temperature of the laminating roller and the thickness of the film in the first attenuated zones is such as to allow the laminating layer to reach said lamination temperature whilst the thickness of the ply outside the attenuated zone which is in contact with the crests of the grooved lamination roller is such that the lamination layer outside the attenuated zone does not reach said lamination temperature, where the first attenuated zones and the bonding zones become generally coincident; and as an apparatus in which the crests of the grooves of the laminating roller are wider than the first attenuated zone and in which the side of the ply opposite to the face in contact with the other ply is heated in the lamination station, preferably by supplying heat to the interior of the grooved laminating roller.

A similar effect can find particular use when transverse flutes in a ply will be formed by shrinkage of the other ply, as explained in connection with FIGS. 4 and 5. In such case the lamination roller which directly contacts the first mentioned ply, needs not be supplied with grooves but may be smooth, provided the ply has been supplied with first attenuated zones and the process conditions are adjusted so that the bonding only takes place in these zones. See further at the end of description to FIGS. 4 and 5.

With reference to FIGS. 5 and 6, the first attenuated zones are formed on and at the tips of roller 8 by the transverse stretching produced by the intermeshing between this roller and roller 7. If the surface shape of roller 8 or other process parameters are not properly adapted to the composition and state of the ply which is being stretched, this stretching may come out as a twin zone with unstretched or less stretched material between the stretched tracks. In such cases each first attenuated zone should, in the understanding of the claims be considered as comprising the total of both twin zones and the unstretched or less stretched track between them.

In addition to first attenuated zones in at least one of the two plies, such ply can be supplied with a further set of solid-state attenuated zones, hereafter referred to as the second such zones. They are located between each pair of adjacent first attenuated zones are narrower than said first attenuated zones and are placed on the non-bonded crests of the respectively ply. This is illustrated in FIG. 3. The method of manufacturing these second attenuated zones is specified a method characterized in that prior to or after the formation of the first attenuated zones, another set of grooved rollers produces second attenuated zones which are another series of solid state oriented narrow zones in the same ply, parallel with the first attenuated zones and narrower than the latter, while the grooved rollers which produce 20 said second attenuated zone are coordinated with the grooved rollers which produce the first attenuated zones so that each second attenuated zone becomes located generally in the middle between two neighboring first attenuated zones and as apparatus comprising, between the said grooved stretching rollers and the laminating station, a second set of grooved stretching rollers, which stretches the material of the said respectively in a solid state and in a direction generally perpendicular to the flutes to form second attenuated zones extending parallel to and between said first attenuated zones which are narrower than said first attenuated zones, whereby the second attenuated zones become the troughs of the flutes.

The second attenuated zones act as "hinges", and if they are made narrow and deep enough they improve the stiffness, since the cross-section of A becomes zig-zagging instead of smoothly waved (as described further in connection with FIG. 3) and A and B thereby get triangular cross sections. The second attenuated zones can also in some cases facilitate the manufacturing process, as it is explained below.

In addition to the improvements in stiffness and resilience caused by the first and second attenuated zones (improvements seen in relation to the average thickness of A) each set of zones also in many cases improves the resistance against shock action, such as impact strength, shock-puncture resistance and shock-tear propagation resistance. This is because there is started a stretching in the ply transverse to the flutes, and this stretching often has a tendency to progress under shock action, whereby the first and second attenuated zones can act as shock-absorbers.

The proper location of the first attenuated zones relative to the zones of bonding can be established by suitably coordinating the grooved stretching rollers which make the "first attenuated zones", with the grooved rollers for lamination.

The second attenuated zone which have been described above, can be formed by stretching between a further set of grooved rollers suitably coordinated with the grooved rollers which produce the first attenuated zones.

The advantages of the first and second attenuated zones in terms of product properties have already been explained. An advantage in terms of process features is that the first attenuated zones allow increases of velocity and therefore improved economy, since the zones in ply A which are going to be bonded, have been made thinner and therefore require less heating time during the application of heat prior to the bonding. Furthermore the first attenuated zones and in particular the combination of first and second attenuated zones can be of great help for the process by acting as hinges in ply A. In the type of apparatus in which the grooved roller for lamination has grooves which are generally parallel with its axis, these hinges make it possible to direct even relatively heavy A-ply into fine grooves. In the type of apparatus in which the grooves are circular or helical, but in any case approximately perpendicular to the roller axis, the hinges help to keep ply A in track during its passage from grooved roller to grooved roller, in other words the hinges help to coordinate the action of the grooved lamination roller with the action of the preceding set or sets of grooved rollers which form the flute under a simultaneous transverse stretching.

Preferable ways of coordinating and carrying out the different grooved roller operations are further specified: as methods characterized in that this ply is passed from its exit from the last of the grooved and fluting rollers to the grooved lamination roller over one or a series of heated, grooved transfer rollers, the grooved rollers in the row starting with the grooved stretching rollers and ending with the grooved lamination roller each being in close proximity to its neighbor or neighbors, whereby each of the grooved rollers in the row has the same pitch when measured at their respective operational temperature, and being mutually adjusted in the axial direction for alignment of the grooves; characterized in that each grooved roller used to form the flutes in one of the plies and each grooved roller used to form the first attenuated zones in this ply if such zones are produced, and each grooved roller used to form the second attenuated zones if such zones are formed in this ply and a grooved roller which the ply follows before and during the lamination if such roller is used, are rollers in which the grooves are essentially parallel with the roller axis, and means are provided to hold the flutes of the said ply in the respective grooves during the passage from the position where the flutes are formed to the position where lamination takes place, said holding means adapted to avoid a frictional rubbing on the ply during said passage; characterized in that the flutes in this ply are formed by use of an air jet or a transverse row of air jets which directs A into the grooves on the forming roller; characterized in that first attenuated zones are formed by grooved rollers acting in coordination with the grooved roller used for lamination, and said coordination consists in an automatic fine regulation of the relative velocities between the rollers; and characterized in that said second attenuated zones are formed by grooved rollers acting in coordination with the grooved rollers used to produce the first attenuated zones, and said coordination consists in an automatic fine regulation, of the relative velocities between the rollers and as apparatuses: in which the last of the grooved stretching rollers is in close proximity to the grooved laminating roller and the grooves of each are of the same pitch at the operating temperature of the apparatus and being aligned; comprising one or a series of heated grooved transfer rollers located between the last of the grooved stretching rollers and the grooved laminating roller, adjacent rollers being close together, the grooves of the stretching, transfer and laminating rollers having the same pitch at the operating temperature of the apparatus and being aligned with one another; in which the grooved fluting roller for one of the plies has the grooves arranged substantially parallel with the roller axis and in which substantially frictionless holding means are provided for holding the flutes of the respective ply in the grooves; and in which the frictionless holding means comprises air pressure difference between opposite sides of the ply at the groove.

The films used for each of the plies are usually but not always (as it appears from the foregoing) prior to forming of the waved configurations and prior to making of the first and second attenuated zones (if such zones are made), supplied with orientation in one or both directions, the resultant main direction of orientation in each ply being generally in the direction which is selected to become the direction of fluting. This can be by means of a strong melt orientation, or preferably, alternatively or additionally by known stretching procedures carried out in the solid state. If the process is adapted to make the flutes generally parallel with the machine direction, this will be a generally longitudinal orientation process, which is simple, and if the process is adapted to make the flutes generally perpendicular to the machine direction, it will be a generally transverse orientation process which is much more complicated to establish, and usually requires expensive machinery but is well-known.

More precisely expressed one or both plies will normally, outside their first attenuated zones if such zones are present, be molecularly oriented mainly in a direction parallel to the direction of their flutes or in a direction close to the latter. (The main direction of orientation can be found by shrinkage tests).

Thus, in the judgment of the inventor, the product of the invention in its most important embodiment is a crosslaminate with the main direction of orientation in each ply generally coinciding with the direction of its flutes. If one or both plies are composed of several films, the said orientation mainly in a direction parallel to the direction of the flutes, should be understood as the resultant of the different monoaxial or biaxial orientations in the said films, which may be differently directed.

As an example, ply A may consist of a single coextruded film with orientation and flutes extending in the machine direction, while ply B, the flutes of which extend perpendicular to the machine direction in itself is a crosslaminate of two films, each oriented at an angle substantially higher than 45° (e.g. one +60° and the other −60°) to the machine direction. Each of these obliquely oriented films can be produced by helical cutting of a longitudinally oriented tubular films as described e.g. in EP-A-0624126 and GB-A-1526722, both mentioned above, and disclosed in more detail in EP-A-0426702. The last specification also discloses a method of obtaining a uniaxial or strongly unbalanced melt orientation which is perpendicular to the machine direction, namely by twisting of a tubular film coming out of the extrusion die followed by helical cutting under the calculated angle.

The ply which in itself is a crosslaminate, should preferably be made as a laminate prior to the flute producing process step, preferably a lamination through lower melting, coextruded surface layers.

Similarly ply A, instead of being a single coextruded longitudinally oriented film, may in itself be a crosslaminate of two films, each oriented at an angle substantially lower than 45° (e.g. one +30° and the other −30°) to the main direction, and each produced by helical cutting. These two films may after their joining be further stretched in the direction which then is machine direction. Of course this is more complicated than simply using one coextruded longitudinally oriented film as ply A, but it can provide essential improvements in tear and puncture strength.

A very surprising property of the laminate according to the invention is an improved heatseal strength when the seal is tested by peeling (as opposed to shear testing of a seal) especially when shock tested so. Provided the boundary of the seal is made with a pronouncedly smooth sealer bar as normal in heatsealing, instead of a sharpedged sealer bar, a result of the flute form is that there are shaped out fine and even "pockets" at the boundary of the seal, which "pockets" are found to give a very pronounced shock absorbing effect, protecting the seal during shock peeling.

While the use of the present invention mainly is for strength film, this needs not always mean high strength in all directions. By contrast there are cases, e.g. in construction of bags, where the focus should be on the strength in one direction, combined with a certain puncture and tear propagation resistance. As an example a conventional industrial bag of film thickness 0.160 mm made from a blend of 90% LDPE and 10% LLDPE will typically in its longitudinal direction show a yield force of 20 Ncm$^{-1}$, i.e. a yield tension of 12.5 MPa and in its transverse direction shows a yield force of 16 Ncm$^{1-}$, i.e. a yield tension of 10.0 MPa.

Commercially available crosslaminated film material in average thickness 0.086 mm for heatsealable bags developed by the inventor and manufactured in accordance with the above mentioned EP-A-0624126 shows in its strongest direction a yield force of 20 Ncm$^{-1}$, i.e. 23 MPa, and in its weakest direction a yield force of 17 Ncm$^{-1}$, i.e. a yield tension of 20 MPa.

Since the invention in principle relates to flexible laminates for uses where relatively high strength is required, although the emphasis of the invention is on stiffness, feel and appearance, the yield tension of the laminate in its strongest direction should normally be no less than 15 MPa, preferably no less than 25 MPa. Correspondingly the ultimate tensile tension is conveniently about twice the said indicated values, or more. Here the cross section in mm$^2$ is based on the solid material only, not including the air spaces, and it is an average, considering that ply A may have attenuated zones. The yield tensions mentioned here refer to tensile testing at an extension velocity of 500% per minute. They are established from strain/stress graphs. These graphs will begin linear according to Hook's law, but will normally soon deviate from linearity although the deformation still is elastic. In principle the yield tension should be the tension at which the deformation becomes permanent, but this critical value, which is velocity dependent, is practically impossible to determine. The way yield tension is normally determined in practice, and also considered determined in connection with the present claims is the following:

In case the tension reaches a relative maximum, then remains constant or decreases under continued elongation, later to increase again until break occurs, the relative maximum of the tension is considered to be the yield tension. The sample may also break at this point, and then the yield tension equals the ultimate tensile tension. If however the tension continues to increase with the continued elongation, but with much lower increases in tension per percentage elongation, then the strain/stress curve after yield, and after it practically has become a straight line, is extrapolated backward to intersect with the line which represents the Hook's-Law-part of the stretching. The tension at the intersection between the two lines is the defined yield tension.

An embodiment of the invention is characterisation in that at least one of the plies by the choice of polymer material or by an incorporated filler or by orientation, within the non-bonded zones exhibits an average yield tension parallel to the direction of fluting, which when it is determined as explained above, if no less than 30 N mm$^{-2}$=30 MPa (cross section of ply A alone), preferably no less than 50 MPa and still more preferably no less than 75 MPa.

An example of a laminate construction which can be simpler in manufacture than a crosslaminate, and still for many purposes can be considered a high strength laminate, is a laminate according to the invention in which one ply, say A, is uniaxially or biaxially oriented in very unbalanced manner with the main direction of orientation generally coinciding with its direction of flutes (this may mainly be the machine direction or mainly be perpendicular to the latter) while ply B, without exhibiting a main direction of orientation generally perpendicular to that of A, is biaxially oriented so that the orientation outside its first attenuated zones (if such zones are present) anyway is higher than A's average orientation in the same direction outside its first attenuated zones (if such zones are present). Ply B may simply be a strongly blown film.

In some cases there is advantage of having different elastic properties in different directions, and in such cases the materials may be chosen so that B has a lower coefficient of elasticity than A, both as measured in the direction perpendicular to the flute direction of A.

In an interesting special case, e.g. for bags which shall withstand a drop from a great height, the choice of material for B and the depth of A's fluting is such that by stretching of the laminate perpendicular to the direction of A's fluting up to the point where A's waving has disappeared, B still has not undergone any significant plastic deformation, preferably B is selected as a thermoplastic elastomer. A is also in this case oriented in a direction parallel to the flutes or close hereto (orientation in first attenuated zones is disregarded).

As it appears especially from the introduction, the present invention is expected to be applicable in several very different fields of uses, also uses where stiffness is the most important requirement, for example the use for stand-up pouches. A laminate characterized in that by the choice of polymer material or by an incorporated filler or by orientation, the coefficient of elasticity E in at least one of the plies, measured in the unbonded zone of the ply in the direction parallel to the flute, as an average over the unbonded zone is no less than 700 MPa, and preferably no less than 1000 MPa specifies the stiffness selected for such applications.

Some or all of the flute in one or both plies may be flattened at intervals, and then preferably bonded across each ones entire width at the flattened locations to make the two arrays of flutes form closed pockets. The flattened portions of a number of mutually adjacent flutes or of all flutes should usually be in array. The flattening can serve as preforming of a sharp bending in the final product, e.g. to help making a stand-up pouch, or making the bent edges of a tarpaulin. The closed pockets may also be made for purposes of "the encapsulation/canalization aspect" of the present invention, which now shall be described.

The encapsulation canalization aspect comprises a number of embodiment which for different practical purposes utilize the interior cavities in the laminate, optionally in combination with suitable perforations, either to canalize a flow of liquid or air, or to encapsulate filling material in particular, fibrous, filament or liquid form. The latter may e.g. be a preservative for goods packed in the flexible laminate. These different embodiments and some of their applications appear from products: characterized in that at least some of the channels formed by the flutes in A and B, which channels may be closed to pockets, contain a filling material in particulate, fibrous, filament or liquid form; characterized in that said material is a preservative for goods intended to become packed in or protected by the laminate, preferably an oxygen scavenger or ethylene scavenger, a biocide, such as a fungicide or bactericide, a corrosion inhibitor or a fire extinguishing agent, optionally with micro-perforations established in the flutes to enhance the effect of said preservative; characterized in that both A and B are supplied with a multitude of perforations, whereby the perforations do not reach into the bonded spots, and the perforations in A are displaced from the perforations in B so as to cause gas or liquid when passing through the laminate, to run a distance through the flutes generally parallel to the main surfaces of the laminate; the channels formed by the flutes may be closed to form pockets; characterized in that the channels or pockets contain filling material adapted to act as a filter material by holding back suspended particles from a fluid passing through the channels or pockets or is an absorbent or ion-exchanger capable of absorbing or ion-exchanging matter dissolved in such fluid, said filler optionally being fibre-formed or yarn-formed; in which by choice of hydrophobic properties of at least the inner surfaces of the channels or pockets formed by the flutes and by selected small spacing of said channels or pockets, and choice of the distances between the mutually displaced perforations in A and B, there is achieved a desirable balance between the pressure needed to allow water through the laminate and the laminate's capability to allow air and vapour to pass there through; characterized by a nap of fibre-like film portions protruding from the borders of the perforations of at least on one surface of the laminate; used as a sanitary backsheet, preferably on a diaper or as a sheet for covering a patient during surgery; used for insulation of buildings; and used as a geotextile which allows water to pass but holds fine particles back, methods of making these products: characterized in that particulate, liquid or fibre- or yarn-formed material is filled into some at least of the channels formed by the two arrays of flutes, this filling taking place prior to or during the lamination; characterized in that after filling the filled channels are closed at intervals by pressure and heat to form filled pockets; characterized in that prior to, simultaneously with or following the filling step perforations are made in the laminate at least on one side to help the filling material or part thereof dissipate into the surroundings or to allow air or liquid to pass through the filling material; characterized in that there is made a multitude of perforations in the first and in the second ply, but limited to areas, where the two plies are not bonded together, and the perforations in the first ply being displaced from the perforations in the second ply to force air or liquid which passes through the laminate to run a distance along one or more channels; characterized in that in one process step there is melted a multitude of holes in the first but not in the second ply or in the second but not in the first ply, these holes being formed by contacting flutes of the first ply with protruding surface parts of a hot roller, which are moved at essentially the same velocity as the laminate; characterized in that the holes are formed by contacting flutes of the second ply with protruding preferably sharp, surface parts of a hot roller, which are moved at essentially the same velocity as the laminate, while heat insulating material prevents the flutes from contacting the hot surfaces of the roller, and preferably the laminate is pressed towards the protruding parts by means of air jets; characterized in that there is drawn a protruding nap of fibre-like film portions out from the molten surroundings of the holes by blowing air in between the laminate and the hot roller, where the laminate leaves the roller and apparatuses: in which downstream of the grooved laminating roller in the lamination station there is a flute flattening station in which at least some of the flutes in each ply are flattened and the plies bonded to one another under heat and pressure to form closed pockets; in which the flute flattening station comprises bars and/or cogs extending generally in the machine direction or the cross-direction and counter rollers, bars or cogs against which to bear; comprising flute filling means for filling the flutes of one or both plies before or during the lamination station with particulate, fibre or liquid material. The embodiment of the present invention in which the fine canals or pockets are used to entrap preservatives, have obvious advantages over the usual method of blending such agents with the polymers to be extruded into film form. One advantage is that the concentration of the preservative can be much higher, another that the preservative needs not be able to withstand the temperature of extrusion. The preservative may reach the object to be preserved by migration alone, or if the agent is solid it may gradually evaporate and diffuse through sufficiently fine perforations or pores.

It is also customary to contain preservative agents in small bags which are placed inside a package. Compared to this method of protection, the present invention has the advantage that the preservative agent can be distributed almost homogeneously over the full area of the packing material.

The filter material stated in a laminate characterized in that the channels or pockets contain filling material adapted to act as a filter material by holding back suspended particles from a fluid passing through the channels or pockets or is an absorbent or ion-exchanger capable of absorbing or ion-exchanging matter dissolved in such fluid, said filler optionally being fibre-formed or yarn-formed has many potential uses, e.g. as a geotextile (A laminate used as a geotextile which allows water to pass but holds fine particles back) but also for instance for water treatment in the chemical industry and in gas face masks.

The laminate in which by choice of hydrophobic properties of at least the inner surfaces of the channels or pockets formed by the flutes and by selected small spacing of said channels or pockets, and choice of the distances between the mutually displaced perforations in A and B, there is achieved a desirable balance between the pressure needed to allow water through the laminate and the laminate's capability to allow air and vapor to pass therethrough, which makes use of the capillary effects within the channels formed by the flutes, is an improvement over micro porous film for similar purposes, since the balance between the water stopping and air allowing effects can be optimized. The uses are especially as backsheet e.g. on diapers, for moisture protection in building constructions, and for "breathable" bags. However, for other purposes such as e.g. manufacture of a filter material for waterbased suspensions, there may contrarily be given hydrophilic properties to at least the inner surfaces of the channels or pockets formed by the flutes. This can be achieved by the choice of the polymer material which forms these surfaces, or by a surface treatment, e.g. by pressing or sucking corona-treated air from one surface to the other through the described system of perforations and channels.

The hydrophobic properties e.g. of flutes made from polyolefin, may gradually decrease due to migration of a part-hydrophilic additive, e.g. an antistatic agent or a dispersive for pigments. When such additives cannot be avoided, this effect can be counteracted by adding small amounts of a pronouncedly hydrophobic oil, e.g. paraffin oil, which also can migrate and "compete" with the hydrophilic substance.

The hydrophobic or hydrophilic properties of the channels formed between plies A and B, and/or the filtrating ability of the channel system, can be enhanced by inserting in the laminate between A and B and bonded to both, a fine fibrous web, e.g. a film with coextruded bonding layers on the surfaces, which film before the lamination has been subjected to fibrillation by well-known means to achieve a fine fibre-network. The web can also advantageously be a fine web of melt-blown fibres, made from a lower melting polymer which can heatseal to both plies A and B.

The special way of making the perforations by melting, as described in a method characterized in that in one process step there is melted a multitude of holes in the first but not in the second ply or in the second but not in the first ply, these holes being formed by contacting flutes of the first ply with protruding surface parts of a hot roller, which are moved at essentially the same velocity as the laminate and a method characterized in that the holes are formed by contacting flutes of the second ply with protruding preferably sharp, surface parts of a hot roller, which are moved at essentially the same velocity as the laminate, while heat insulating material prevents the flutes from contacting the hot surfaces of the roller, and preferably the laminate is pressed towards the protruding parts by means of air jets, is simple and reliable to practise since the crests on the two surfaces of the laminate are protruding so that the hot roller parts safely can form holes in one ply without harming the other ply. It is also a fast method. Further details appear from example 4.

As specified in a method characterized in that there is drawn a protruding nap of fibre-like film portions out from the molten surroundings of the holes by blowing air in between the laminate and the hot roller, where the laminate leaves the roller, the material which is melted in the process of melt perforating can be dragged to form the nap a laminate characterized by a nap of fibre-like film portions protruding from the borders of the perforations of at least on one surface of the laminate. In this case the surface contacting the nap-dragging hot roller must consist of a polymer material which sticks sufficiently to the roller, e.g. it may consist of an ionomer/ethylene copolymer. This can e.g. give a napkin or a sheet for covering a patient during surgery a textile-like feel. Apparatus is defined as comprising perforating means for cutting or melting holes into the flutes of one or both plies in non-bonded zones; Apparatus defined in which the perforating means comprise a driven perforating roller having an arrangement of heated protrusions which contact and melt the material in the flutes of the respective ply. Apparatus defined as further comprising pressurized air outlets for directing air at the ply while the material surrounding the perforations is molten. Apparatus defined in which the flutes of the ply are directed into contact with said protrusions by air jets directed at the surface of the ply opposite to the perforating roller.

As an alternative to the perforating at elevated temperature, especially as this is described in example 4, the flutes in each ply can during their formation be supplied with protruding "bosses" by use of a row of tips on some of the cogs which form the flutes, and the crests of these protruding "bosses" can continuously be "shaved" off after the lamination. Also in this way, holes going through both plies can be avoided.

The flutes of the laminate can also be used to give bags anti-slip properties. When filled bags are placed in a stack, they are mainly arranged so that each bag has its direction of length perpendicular to the length of the bags immediately under it. To fit with this stacking arrangement, bags made from the laminate of the invention can with advantage be constructed so that the flutes on one of its two major surfaces are generally perpendicular to those on the other major surface.

A further aspect of the invention, in which one or both of the plies is or are flat when fed to the laminating rollers is provided as a method of manufacturing a laminate of a first ply with a second ply both mainly consisting of orientable thermoplastic polymer material and each having one face comprising a lamination layer in which the first and second plies are continuously fed in face to face relationship with the lamination layers in direct contact with one another between a pair of laminating rollers between which heat and pressure is applied, whereby the lamination layers become adhered to one another, in which the second ply is oriented mainly transversely of the machine direction, and is generally not shrinkable in solid state in the direction transverse to its orientation, and the first ply as it is fed to the lamination rollers is heat-shrinkable mainly in a shrink direction which is generally parallel with the machine direction, the lamination rollers apply heat and pressure in bonding zones arranged in continuous or discontinuous rectilinear lines extending in a direction which is generally perpendicular to said shrink direction, and after lamination the first ply is caused to shrink in solid or semisolid state in the said shrink direction, whereby the second ply becomes fluted with flutes extending perpendicular to said shrink direction and having a wavelength at the highest about 5 mm; as a method of manufacturing a laminate of a first ply with a second ply both mainly consisting of orientable thermoplastic polymer material and each having one face comprising a lamination layer in which the first and second plies are continuously fed in face to face relationship with the lamination layers in direct contact with one another between a set of laminating devices between which heat and pressure is applied, whereby the lamination layers become adhered to one another, in which the second ply is oriented mainly transversely of the machine direction, and is generally not shrinkable in solid state in the direction transverse to its orientation, and is prior to the lamination rollers, segmentally stretched in its machine direction to introduce first attenuated zones perpendicular to the machine direction, the first ply as it is fed to the lamination rollers is heat-shrinkable mainly in a shrink direction which is generally parallel with the machine direction, the laminating devices comprise on the side facing the second ply a heated flat roller or a heated porous bar adapted to produce a film of hot air to press the plies towards the opposite laminating device, which may be either a roller or a similar bar, the speed of the machine and the temperatures of the rollers being adapted to heat the lamination layer in said first attenuated zones to the lamination temperature, but not to heat the lamination layer in the adjacent non-attenuated zones to the lamination temperature, whereby bonding takes place only in the attenuated zones, and after lamination the first ply is caused to shrink in solid or semisolid state in the said shrink direction, whereby the second ply becomes fluted with flutes extending perpendicular to said shrink direction and having a wavelength at the highest about 5 mm; as a method in which said wavelength is at the highest about 3 mm; as a method in which the first ply is kept substantially flat throughout the manufacturing process; as a method in which the first ply is supplied with waves prior to the lamination, the wavelength being at the highest about 5 mm, preferably at the highest about 3 mm, and the lamination zones are on the crests on one side of the waved first ply; as a method characterized in that, by use of a take-off roller (13) of slightly waved surface, the laminate on its whole is supplied with a longitudinal waving to eliminate a tendency to curling around its transverse direction; as a method in which said rectilinear lines are discontinuous and in which the discontinuities in adjacent lines are aligned in the shrink direction. An example of this method is described below in Example 5.

Apparatus suitable for carrying out this method is laminating apparatus comprising a grooved roller for fluting a first ply of heat-shrinkable thermoplastic polymer material having a main shrink direction parallel to the flute direction, means for continuously directing the fluted first ply and a second ply of thermoplastic material in face-to-face relationship to a laminating station, the laminating station comprising laminating rollers between which heat and pressure is applied in laminating zones between the crests of the flutes of the fluted first ply and the second ply whereby bonding zones are formed extending in continuous or discontinuous rectilinear lines along the crests of the flutes at which the plies are bonded to one another, the apparatus further comprising a heat shrink station in which the first ply in the bonded product is heated to its heat shrink temperature and allowed to shrink, the bonding zones being adapted to allow the second ply to become fluted upon shrinkage of the first ply, the wavelength of the fluting being less than 5 mm; an apparatus in which the second ply is fed to the laminating station as a substantially planar web; an apparatus in which the laminating station comprises a pair of grooved rollers, between which the heat and pressure is applied for lamination, the grooves of the laminating roller in contact with the first ply being parallel to and under operating conditions, having the same pitch as the grooves of the fluting roller for the first ply, and the grooves of the laminating roller in contact with the second ply being arranged at an angle, preferably substantially perpendicular to these grooves; an apparatus in which the laminating station comprises a grooved laminating roller and a substantially smooth counter roller between which the heat and pressure is applied for lamination with the grooved laminating roller in contact with the first ply; the grooves of the grooved laminating roller being parallel to and, under operating conditions, having the same pitch as the grooves of the fluting roller for the first ply; an apparatus which comprises a stretching station for the second ply at which the second ply is segmentally stretched in solid state to produce first attenuated zones extending in a direction at an angle to the direction of the flutes of the first ply, preferably perpendicularly thereto, wherein the substantially smooth laminating roller is heated to a temperature which heats the opposite surface of the second ply in the first attenuated zones to the laminating temperature while the adjacent areas do not reach that temperature.

DETAILED DESCRIPTION OF THE DRAWINGS

The invention shall now be explained in further detail with reference to the drawings.

FIG. 1 is a perspective view of the laminate of the invention, showing the two plies A and B, each supplied with flutes, with the directions of the flutes in the two plies crossing each other, here as it normally will be the case, perpendicular to each other. A part of ply A is removed in order better to show the structure. The two plies are joined by spot-welding within the areas (1) shown by interrupted lines.

Figure 7:
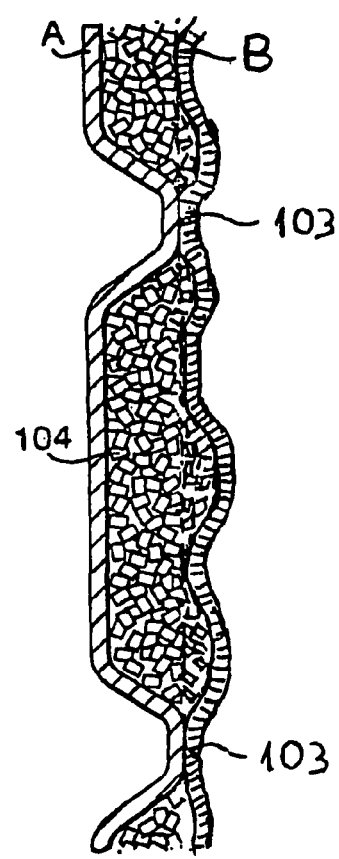
Figure 8:
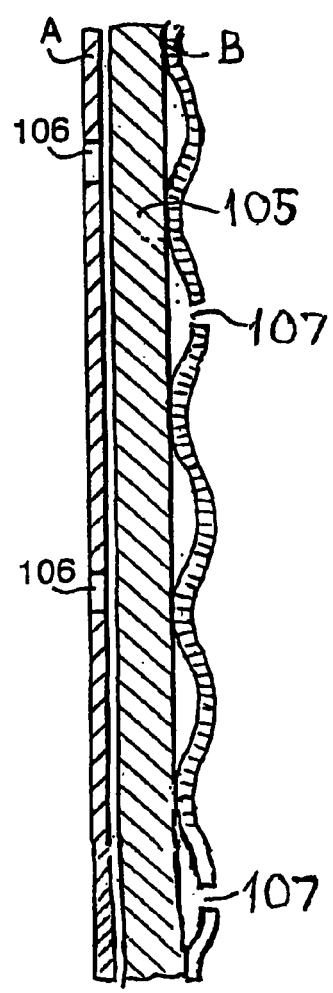
Figure 9:
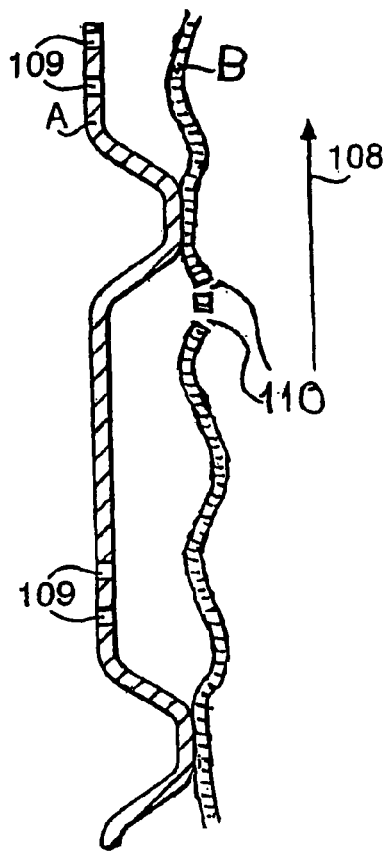

FIGS. 7, 8 and 9 represent sections parallel to the flutes in ply A through the middle of a non-bonded zone in this ply, and through the bonded crests in ply B (therefore corrugations on B cannot be seen) showing applications of the invention in which the channels or pockets formed between ply A and ply B are used as mini-containers or to canalize a flow of air or water, namely in FIG. 7 as mini-containers for a protective agent, in FIG. 8 for filtration and in FIG. 9 for weather protection.

Figure 10:
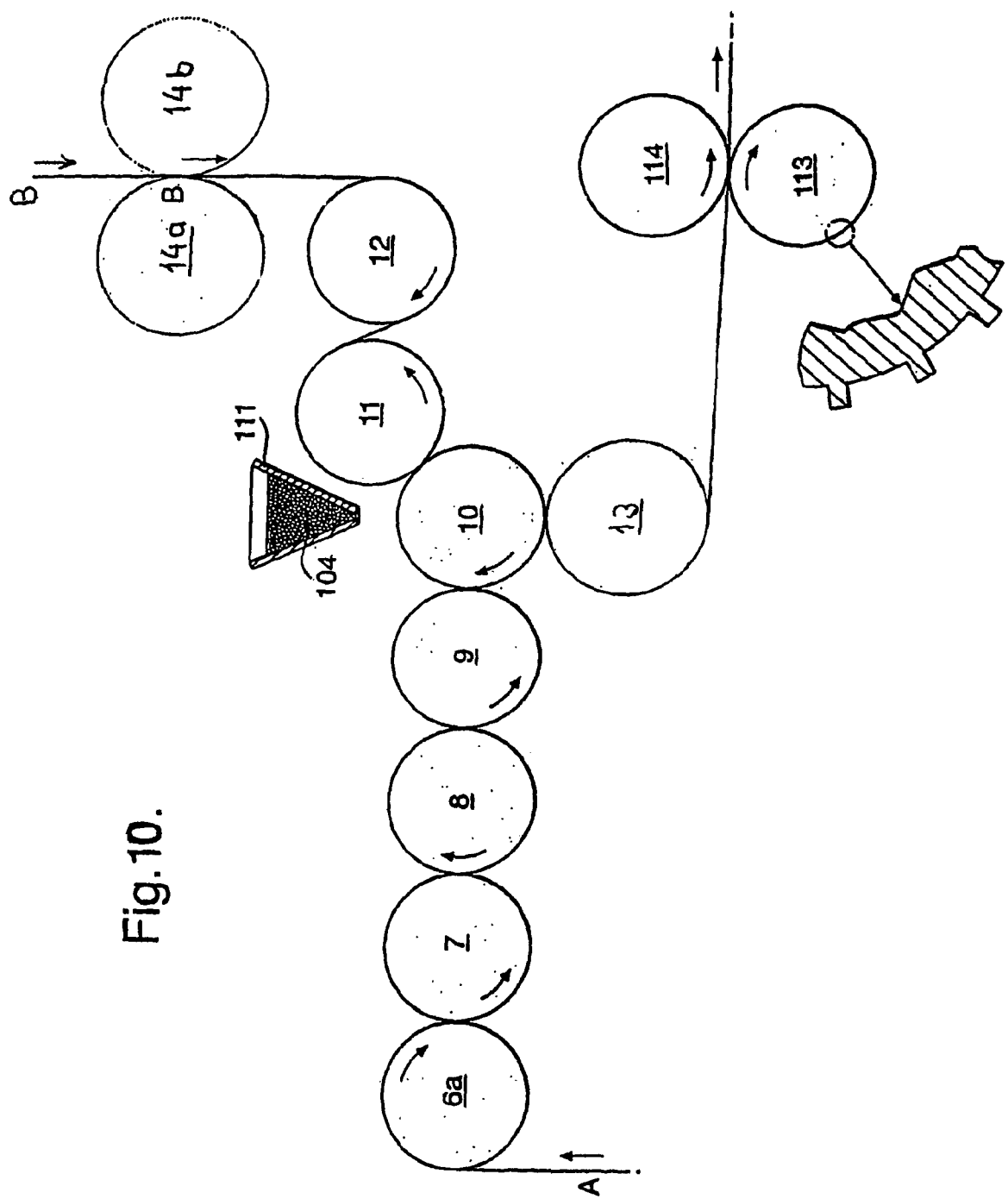

FIG. 10 shows a modification of the lamination station of FIG. 8 in which there are added filling devices to fill particulate material into the flutes before the lamination, and added sealing equipment to form transverse seals after the lamination, thereby making closed pockets which serve as mini-containers for the particulate material.

Figure 4:
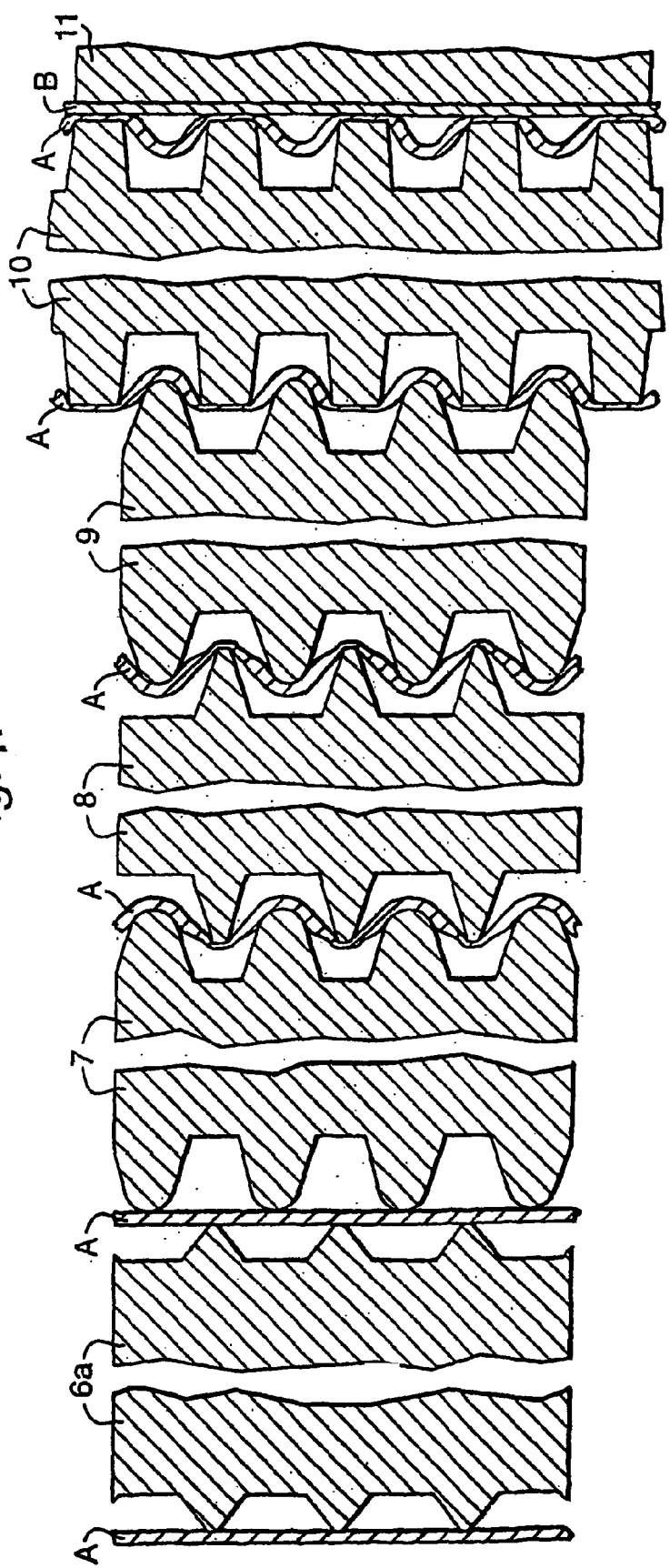
FIG. 4 is a principal sketch representing the steps from formation of the miniflutes in A to lamination of A with B in the manufacture of the product shown in FIG. 2, the different steps being represented by the cross sections of A and B and by the cross sections of the surfaces of the rollers (cross-sections through the axis of the rollers).
Figure 5:
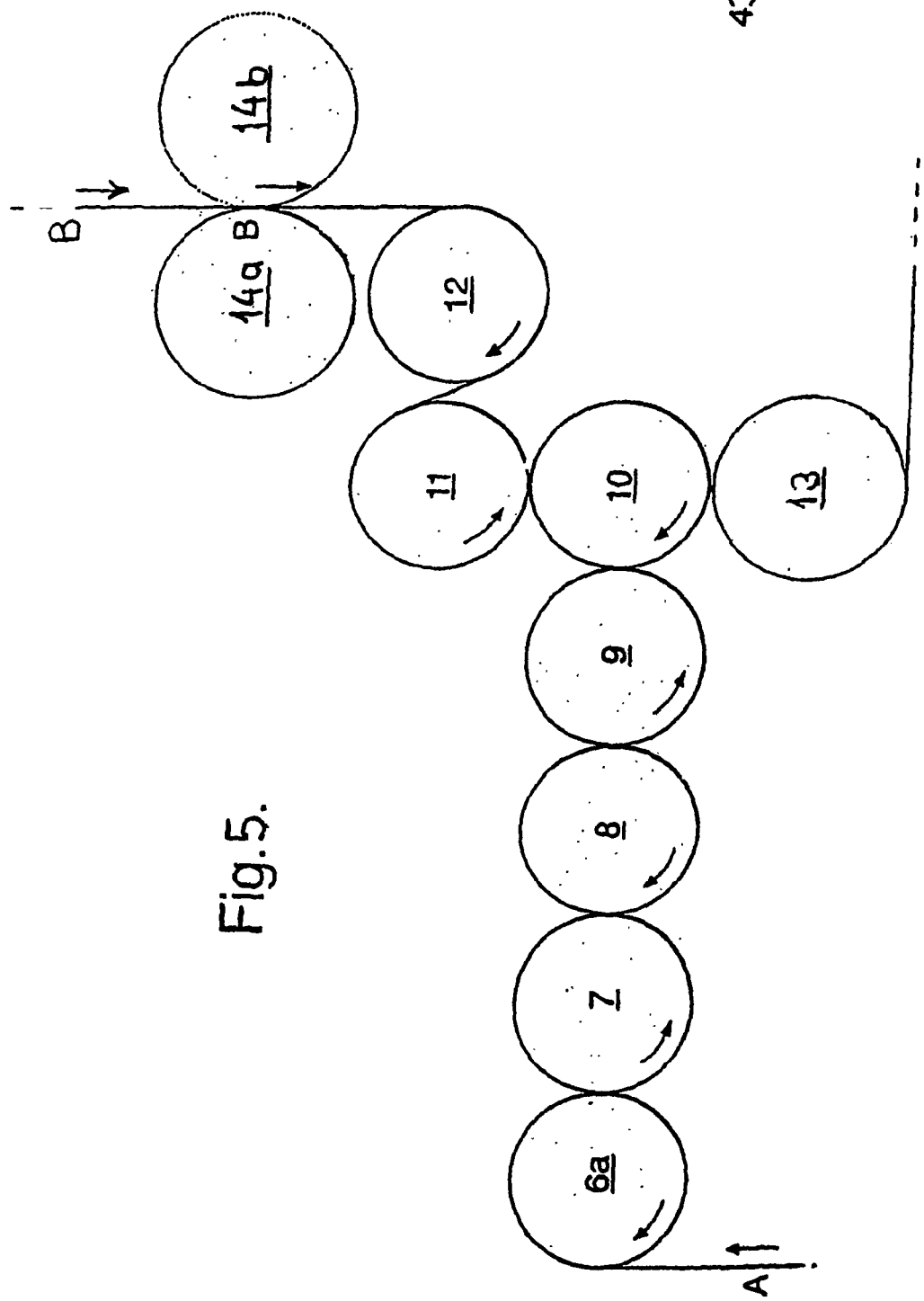
FIG. 5 is a sketch of the machine line corresponding to FIG. 4. The formation of flutes in B does here take place entirely by shrinkage of A after the lamination.
Figure 11:
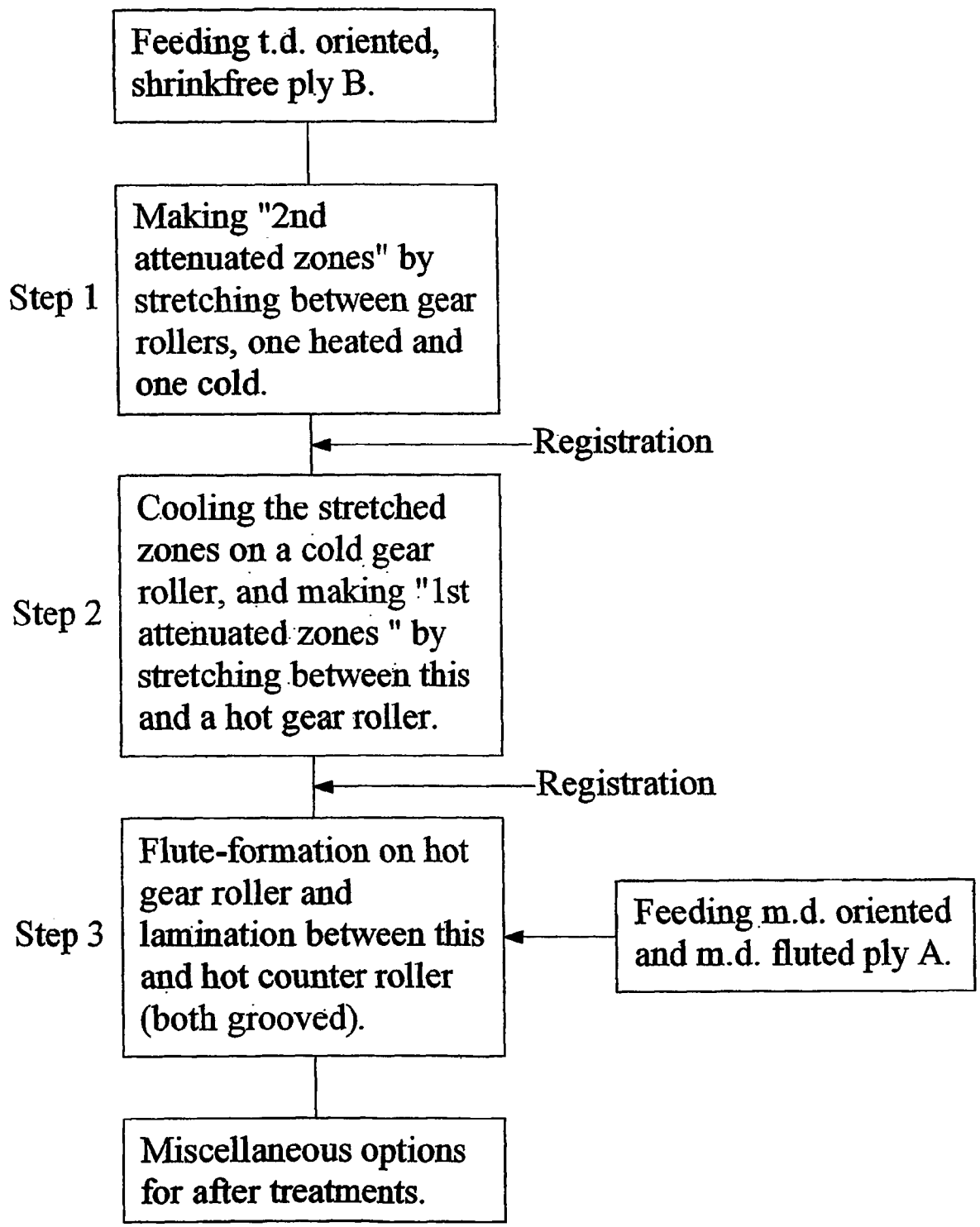

FIG. 11 is a flow-sheet showing a process for producing first and second attenuated zones (as these expressions have been defined), in the transversely oriented B, make transverse flutes, and laminate B with A. The latter has preformed flutes made as shown in FIGS. 4 and 5.

Figure 12:
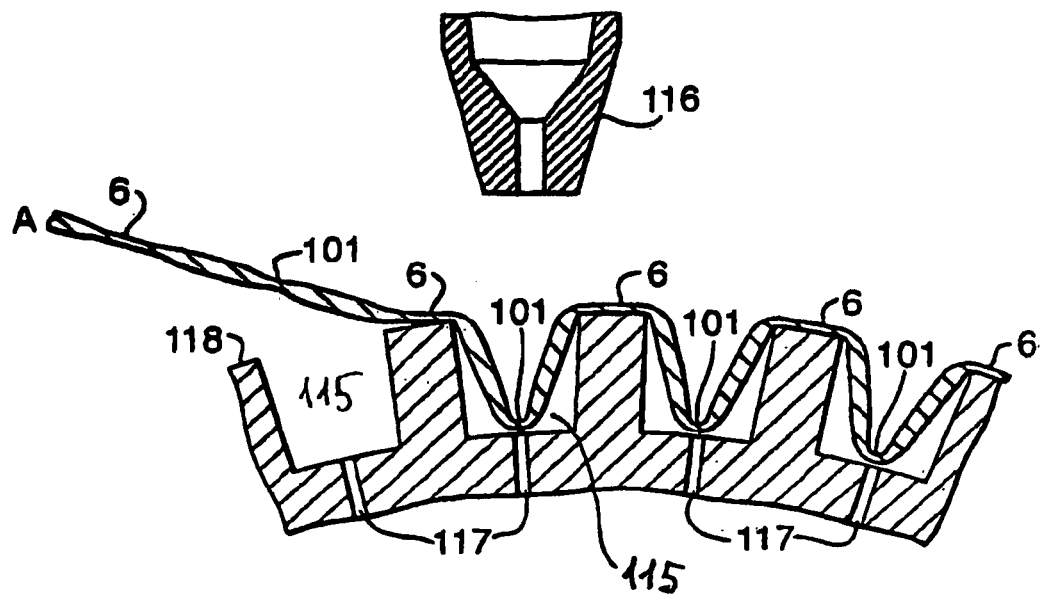

FIG. 12 shows a detail of a grooved lamination roller for formation of transverse fluting, air jets being used to direct the ply into the grooves and vacuum being used to retain it there.

Figure 1:
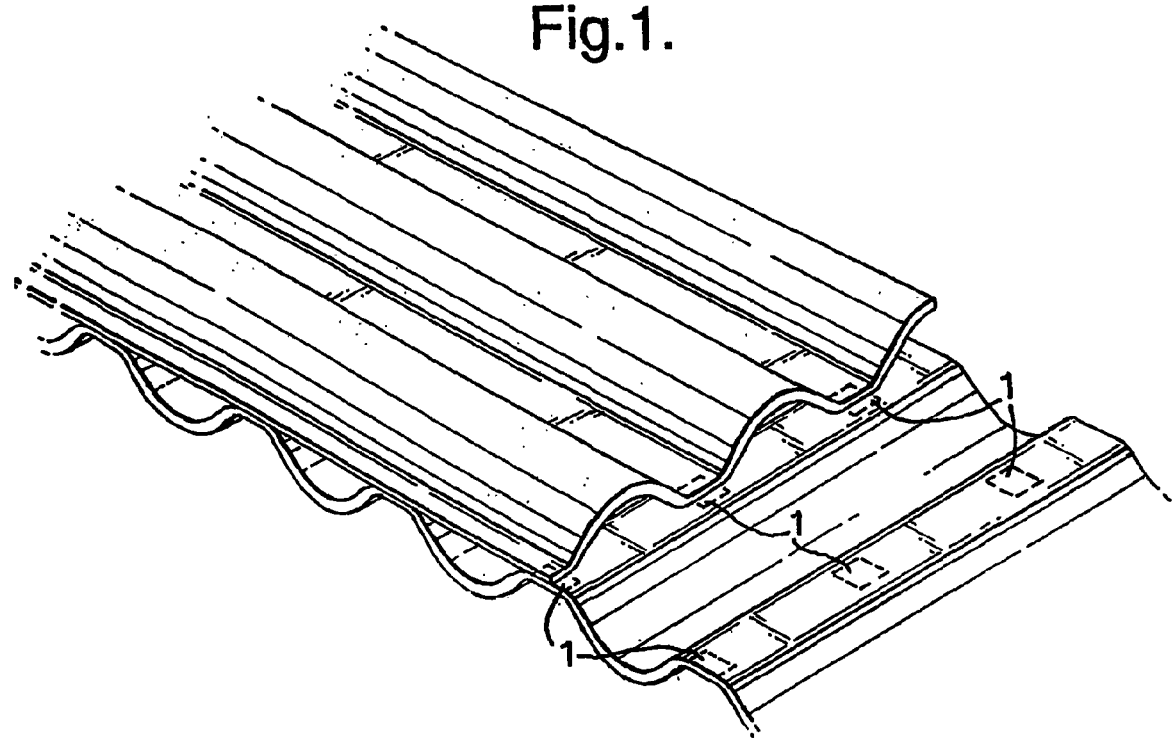
Figure 13:
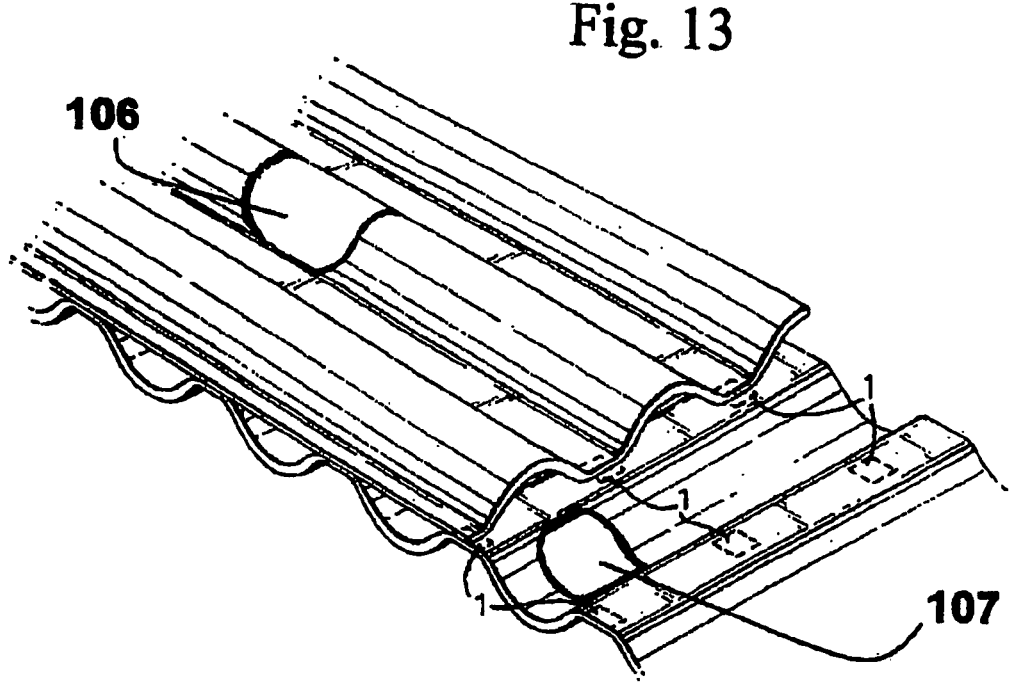

FIG. 13 is a modification of FIG. 1 to illustrate the embodiment of the invention in which there is a first set of holes at one surfaces and a second set of holes at the other surface, whereby the two sets of holes are mutually displaced, so that a fluid passing into the holes at one surface has to penetrate through a channel system before it can get out on the other surface. The channel system may e.g. be hydrophobic.

Figure 14:
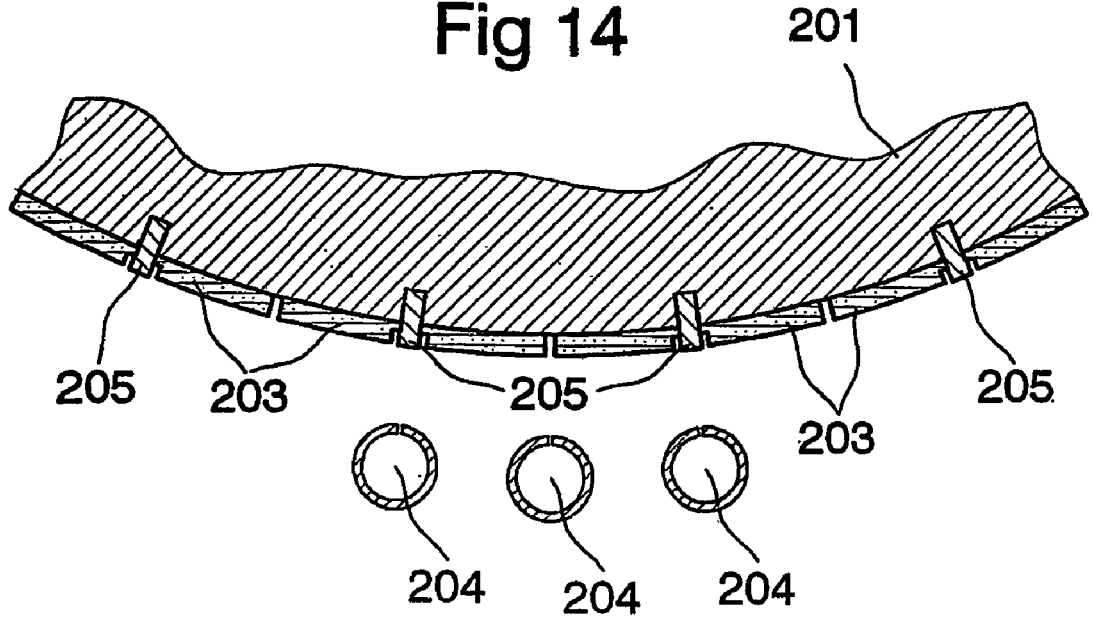
Figure 14A:
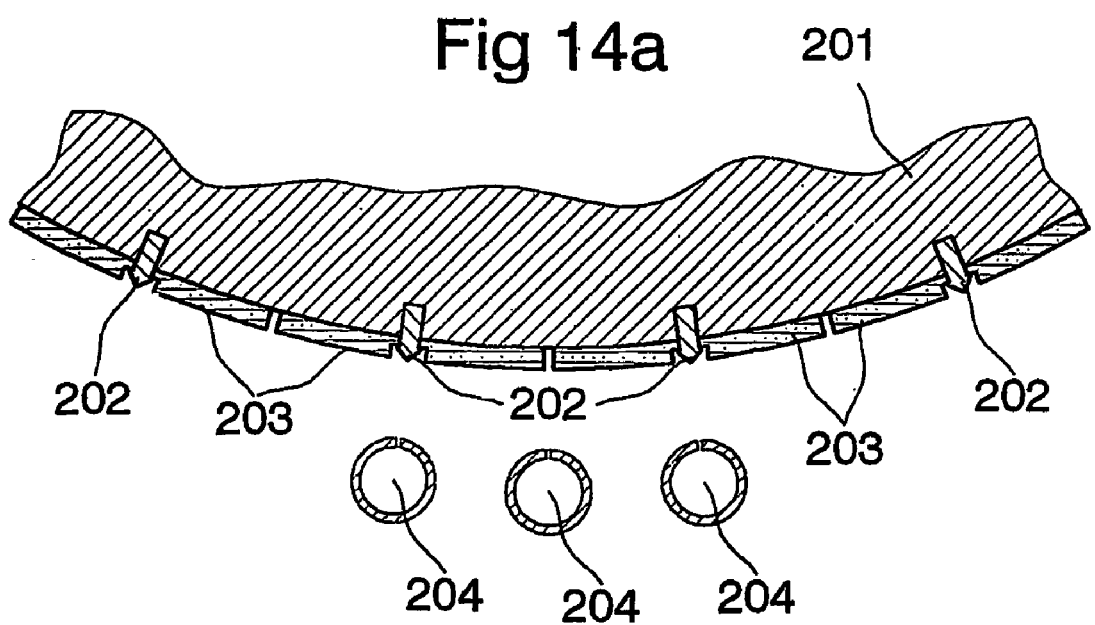

FIGS. 14 and 14*a* are sketches showing segments of two roller units adapted to work together and produce the system of perforations illustrated by FIG. 13. The rollers have spikes, (205) and (202) and operate beyond the melting point of the polymer material. FIG. 14 is for perforation of flutes perpendicular to the machine direction and FIG. 14*a* for perforation of flutes which follow the machine direction.

DESCRIPTION OF PREFERRED EMBODIMENT

Figure 2:
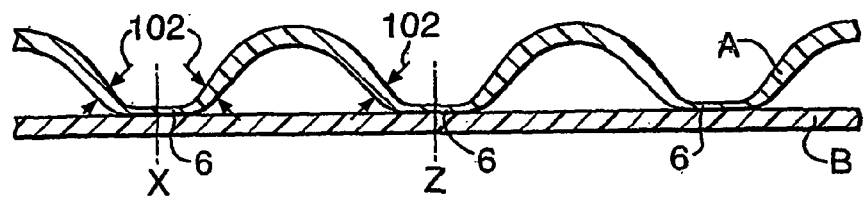
FIGS. 2 and 3 are cross sections representing two different structures of ply A. The section is made through a crest of B, which spot-wise is bonded to crests of A, and therefore the corrugated structure of B does not appear from these figures.
Figure 3:
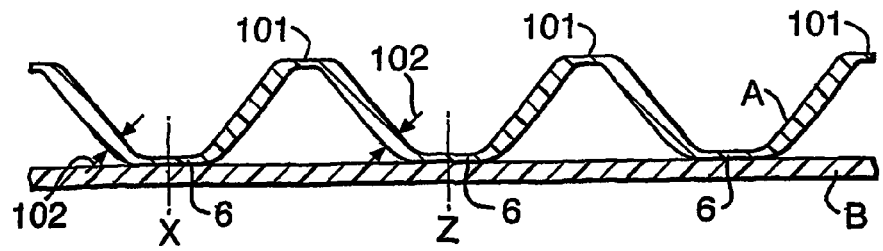

With reference to FIGS. 2 and 3 it should be mentioned for the sake of clarity, that the wavelength referred to in the foregoing and in the claims, is the straight linear distance from x to z. This distance is normally about 5 mm or lower, and as it appears from example 3, the inventor has been able to make it as small as 0.8 mm, which however needs not be the ultimate lower limit obtainable and useful. It is noted that U.S. Pat. No. 5,441,691 (Dobrin et al) makes embossed film (not heat-bonded laminates) having a generally circular shape of the bosses, with a spacing from centre to centre which can be still finer than these 0.8 mm, however contrary to the present invention the bosses of this patent are drawn much thinner than the main body of the film.

In case the flutes are made parallel with the machine direction, the formation of the flutes and the lamination is preferably carried out generally as shown in FIGS. 4 and 5. This means there will always be a transverse stretching between intermeshing grooved rollers. When film is stretched between very fine grooved rollers, there will be a strong tendency to localize the stretching entirely or predominantly on and near to the tips of the grooves. This can be avoided, but with difficulty, by using film which in a preceding process to some extent has been transversely stretched, and feeding the film into the roller at a temperature which is higher than the temperature of the roller.

However, in the laminate structures shown in FIGS. 1, 2 and 3 the differences of thickness resulting from grooved roller stretching has been utilized in a way which generally is an advantage for the properties of the product. By the exact registration between the grooved rollers for stretching, the grooved roller for lamination and a grooved transfer roller therebetween, each bonding zone is arranged so as to fall mainly within an attenuated zone. As it appears from FIG. 3 there can be two sets of attenuated zones for each zone of bonding, namely a series (6) of relatively wider ones (the first attenuated zones) within which the bonding zone fall, and a set of shorter ones (101), the latter referred to as the second attenuated zones.

By attenuating ply A at the basis where it is bonded to ply B, the thickness of A is minimized at the location where its contribution to stiffness is in any case is insignificant. By introducing the narrow second attenuated zones which act as hinges, the cross-section becomes almost triangular as shown in FIG. 3. This means that the stiffness is further improved. In many cases, these attenuated zones also introduce a tendency in the material to stretch rather than rupture under impact actions. To clarify the concepts, each first attenuated zone (6) is per definition delimited by the locations (102) where the thickness of ply A as indicated by arrows is the average between the smallest thickness in this zone and the highest thickness in the adjacent non-bonded zone.

Structures with first attenuated zones as shown in FIGS. 1, 2 and 3 and structures with both first and second attenuated zones, as shown in FIG. 3 can also be produced with machinery which make transverse fluting. This is described later.

Figure 6:
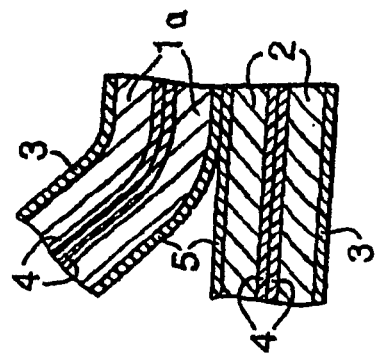
FIG. 6 is an enlarged detail of FIG. 1 to illustrate how these plies themselves can be laminates of films, and how these films can be multilayered as made by coextrusion, this being done to facilitate bonding and lamination.

In FIG. 6 both plies A and B are in themselves laminates, for instance crosslaminates, and each film from which the plies are produced is coextruded. Therefore A and B are each formed by a lamination process (the "pre-lamination") prior to the lamination of A to B. Layer (1*a*) is the main layer in each of the two coextruded films which make A, and layer (2) is the main layer in the two coextruded films which make B. Layers (1*a*) and (2) can e.g. consist of high density polyethylene (preferably HMWHDPE) or iso- or syndio-tactic polypropylene (PP) of blends of one of these polymers with a more flexible polymer, for instance, for HMWHDPE, LLDPE. If stiffness is the most preferred property of the minifluted laminate, plain HMWHDPE or plain PP may be chosen, but if tear and puncture properties play a more important role and/or superior heatseal properties are essential, the mentioned blends may be more suited.

Layers (3) are coextruded surface layers with the function to improve the heatseal properties of the finished laminate and/or modify its frictional properties. Layers (4) are coextruded surface layers (lamination layers) with the two functions: a) to facilitate the pre-lamination and b) to control the bonding strength (in crosslaminates the bonding should not be too strong, otherwise the tear propagation strength suffers).

Similarly, layers (5) are coextruded surface layers to facilitate the lamination of the entire A to the entire B and control the strength of the bonding between A and B.

With reference to FIGS. 4 and 5 the structure shown in FIG. 2 can be formed by passing film (A) first over the grooved pre-heating roller (6*a*) which heats it mainly along the lines which shall become attenuated, then over the grooved stretching rollers (7) and (8), further over grooved transfer and flute-stabilizing roller (9), and finally over grooved lamination roller (10) and its rubber coated counter-roller (11) which is supplied with axial grooves, while film B under low tension is passed over the smooth rollers (12) and (11). The laminate is taken off from lamination roller (10) over roller (13), the surface shape of which has a very slight sinus shape seen in axial section. The purpose of this shape shall be explained in the following. The grooves of all of the above mentioned grooved rollers, except the rubber roller, are circular so that the flutes of A are formed in the machine direction. These rollers are all temperature controlled rollers, rollers (9), (10), (11) and (12) being controlled at the lamination temperature, rollers (6*a*), (8) and (13) at a somewhat lower temperature and roller (7) at a temperature about 20 or 30° C. (There can be further rollers for preheating of B). By choice of suitable, coextruded surface layers—see (5) in FIG. 6—the lamination temperature is kept far below the melting range of the main layers in (A) and (B). The rubbercoated roller (11) is preferably heated by a combination of heating from within and heating from outside (by hot air or infrared irradiation). The temperature of the zones (6) in (A)-reference to FIG. 2—during the transverse stretching between rollers (7) and (8) is preferably still lower, e.g. in the range of about 50-70° C., and the rest of (A) much lower, e.g. around room temperature, as it also appears from the mentioned roller temperatures. If the main layers in (A) and (B) consist of plain HDPE or blends of HDPE and LLDPE, the lamination temperature is preferably chosen between 80 and 110° C., and the coextruded lamination layers, which consist of a suitable plain or blended copolymer of ethylene, are chosen to produce lamination at this temperature.

Ply A is longitudinally oriented prior to the processes shown in FIGS. 4 and 5, under conditions which gives it a tendency to shrink, e.g. 10-25% shrinkage when heated to the lamination temperature. The formation of flutes in B is based on such shrinkage of A.

Ply B is transversely oriented prior to these processes, therefore also has a tendency to shrink. This shrinkage will ruin the process if not properly dealt with. In the drawing it is done by means of grooved rollers 14*a* and *b* which give B a pleating sufficient to compensate for the shrinkage and exactly adjusted for this. This means that on the hot roller 12, B shrinks evenly all over its width in a degree which just is enough to eliminate the pleats. These grooved rollers have a high pitch (see example 1), are set up to pleat without transverse stretching, work at room temperature, and are idle rollers which almost do not increase the tension in the film.

The crests on roller (8) have very small radius of curvature, e.g. about 0.07 mm or a similarly narrow land. The crests on roller (6*a*) which have the function to preheat, may, depending on the film, be similar or of a somewhat greater radius or with a slightly wider land. The crests on rollers (7) and (9) have a bigger radius of curvature to avoid transverse stretching on these crests. Suitable values for the sizes of the grooves are mentioned below in example 1.

The different temperatures on the different grooved rollers cause different thermal expansions, compared to a state where all are at room temperature, and this must be taken into consideration when the grooved rollers are constructed, since they must fit exactly to each other during operation. (10° C. heating of a 10 cm long steel roller segment causes about 0.012 mm expansion of this segment). Reference is again made to values in the example.

Rollers (6*a*), (7), (8), (9), (10), (12) and (11) are driven, the last through (10), while rollers (13), (14*a*) and (14*b*) may be idling.

As it will be understood with reference to FIG. 2, the attenuation of A in the zones (6) takes place almost entirely by the transverse orientation at a temperature essentially below the melting range of the main body of A. This attenuation therefore does not cause any significant weakening of A's transverse strength, contrarily it will often cause an increase of this strength. After the transverse stretching on the crests of roller (8) the width of the first attenuated zones (6) should preferably not exceed (as a rule of thumb) half the wavelength, but the degree of stretching should normally be as high as practically obtainable, while the degree of transverse stretching between the first attenuated zones normally should be as low as practically obtainable, with the intended result that ply A in the unbonded zones becomes as thick as the chosen square meter weight of A allows and the flutes become as high as possible. However, when there is reliance on a shrinkability in A as in example 1, the heating of ply A on roller 9 will cause a tension which tends to reduce the thickness in the unbonded zones and correspondingly increase the depth of the flutes.

The use of longitudinally oriented A-ply will impart a tendency in A to neck down and form thin longitudinal lines when A is transversely stretched on roller 8.

Therefore, longitudinally oriented A-ply will enhance the possibilities of getting a sharp distinction between strongly attenuated zones (6) and non-attenuated ply A between these zones.

The line of rollers (6*a*) to (10), which ply A follows, should normally rotate at equal circumferential velocity. Thus the heating and A's longitudinal orientation will have given A a rather high longitudinal tension when it laminates with B in the nip between the circularly grooved hot lamination roller (10) and the rubber coated axially grooved, hot lamination roller (11). Since roller (13) is idling and the laminate is taken off from this roller under a low tension, ply A will gradually shrink when it has passed this nip where lamination takes place and while it still is on the hot lamination roller (10). Roller (13) is close to roller (10) without contacting it, thereby each fine flute in A will remain in its groove during the shrinkage, and the latter will take place in a well ordered manner, producing regular flutes in B.

Roller (13) also serves to counteract or eliminate a tendency in the final laminate to curl around a transverse direction. This tendency is mainly due to tensions created by the shrinkage of ply A and ply B's resistance to this. While the laminate follows roller (13), which as mentioned is a hot roller, it is bend oppositely, thereby counteracting the effect of "differential shrinkage". Furthermore the surface of (13) may be supplied with a very shallow pattern of circular grooves imparting the laminate with coarse and very shallow, longitudinally extending waves, which completely can eliminate the tendency to curling. These waves can have a depth of e.g. 0.5-5 mm and a wavelength about 10-20 times the depth. The laminate is air cooled while it leaves roller (13) under a low tension. Alternatively there may, prior to the cooling, be arranged further shrinkage while the laminate passes an oven heated with hot air.

With certain modification the line shown in FIGS. 4 and 5 can also be used to make the laminate of FIG. 3, which has second attenuated zones. For this purpose roller (6*a*) should have the same profile and the same low temperature as roller (7), and it should be preceded by and in slight engagement with a roller with the same surface profile as roller (8), which roller should have the same higher temperature as roller (8).

In another modification of the line shown in FIGS. 4 and 5 the rubber-coated lamination roller (11) is not supplied with grooves but is smooth, and ply B is segmentally stretched in its machine direction prior to entering rollers 15*a* and *b* so as to get "first attenuated zones" perpendicular to the machine direction. The temperatures of rollers (12) and (11) are adapted to the thickness of these zones and the velocity of the ply in such a manner that the temperature in the zones becomes sufficient for a good bonding, while it remains insufficient outside the zones.

A technical equivalent of the rubber roller (11) in the process described in connection with FIGS. 4 and 5 (not the process described directly above) is a roller from microporous material supplied with axial grooves and heated like the rubber roller, which in a well-known manner applies hot, compressed air forming a thin air film which prevents contact between the crests of the roller and ply B, but allows a similar lamination pressure as the rubber roller. The advantage is that this air-lubricate roller does not abrade like the rubber roller.

The smooth rubber roller, which can substitute roller (11) when the first attenuated zones are present with suitably adapted heating can similarly be substituted by an air-lubricating, heated body, which does not need to rotate. Its surface may be concentric with roller 10, whereby particular high lamination velocities can be achieved.

In FIG. 7 which as mentioned shows a longitudinal section through a flute in ply A, both plies have been flattened and sealed to each other at intervals (103) to form pockets or "mini-containers", and these mini-containers have been filled with a particulate substance (104) which has a purpose for the use of the laminate, e.g. for protection of material packed or wrapped up in the latter. As one among many options it may be an oxygen scavenger. To enhance the action of the substance the flutes may be supplied with fine perforations on the side towards the packed product. The substance may also e.g. be a fire retardant material such as $CaCl_2$ with crystal water, or just fine sand to increase the bulk density of the laminate.

FIG. 10 which shall be described below, shows how the particulate substance can be fed into the flutes of ply A prior to its lamination with ply B, and how the flutes can be closed to pockets by transverse sealing after the lamination, without any essential contamination of these transverse seals.

A laminate between a fluted thermoplastic film and a non-fluted thermoplastic film with a filling material between is known from JP-A-07-276547 (Hino Masahito). However, in this case the filling material is a continuous porous sheet (for absorption) which extends from flute to flute without interruptions, so that there is no direct bonding between the flute and the non-fluted films. One of the thermoplastic films is first directly extruded into this porous (e.g. fibre-formed) sheet, then the two together are given a fluted shape between gear rollers while the thermoplastic film still is molten, and finally a second thermoplastic film is extruded directly unto this fluted assembly to join with the porous sheet. Hereby the bonding necessarily must be very weak, and the mechanical characteristics must be completely different from those of the present product. The wavelength of the fluting is not indicated.

In the technical filter material for liquid or gas flows shown in FIG. 8 there is inserted a strand or yarn into each flute of A—in connection with the description of FIG. 10 it shall be explained how that can be done—and both plies are supplied with rows of perforations, (106) in ply A and (107) in ply B. These rows are mutually displaced as shown so that the liquid or gas passing from one surface of the laminate to the other, is forced to follow a channel over a distance corresponding to the displacement. The fitting between the yarn and the channel may be improved by shrinkage of A and/or B after the lamination process.

The pocket structure shown in FIG. 7 can also be used for filtration purposes if ply A and ply B are supplied with mutually displaced holes. Then the particulate substance (104) can e.g. consist of active charcoal, or an ion-exchange resin, or for simple filtration purposes fine sand. Also in this case a tightening of the passage by means of shrinkage can be advantageous or may even be needed.

Practical examples of the use of such filter materials are for air filtration systems including absorption of poisonous substances, and ion-exchange processes. In both cases the laminate can have the form of a long web which is slowly advanced transversely to flow which passes through it.

Another practical use is as a substitute of geotextiles e.g. for road constructions. Such textiles must allow water to penetrate but hold back even fine particles. The present laminate, e.g. filled with fine sand in the pockets, is suited for this use.

For such filtration purposes, high puncture strength will often be needed, and the laminate then preferably comprises oriented, crosslaminated films.

The weather protective laminate shown in FIG. 9, e.g. for raincoats, also has a pocket structure, whereby ply A is heat-sealed to ply B by transverse seals as locations (103), but there is no particulate substance in the pockets. Like the laminate for filtration, each line of pockets is supplied with perforations in a displaced system, here shown as groups of perforations (109) in A and similar groups (110) in B, and these groups are mutually displaced. In this sketch it is considered that ply A is on the side where it rains, and a person, animal or item, which the laminate shall protect, is on the ply B side. (It could be the other way round). It is also considered that the direction shown by arrow (108) is upward. Since the perforations (109) are at the bottom of the pockets, and because of the gravity force, only the bottom of the pockets may be filled with rainwater, while in principle no water will reach the perforations (110). On the other hand there is free passage of air and transpiration between the hole groups (109) and (110). A laminate according to the invention, supplied with pockets and perforations on both sides, especially perforations near each boundary of each pocket, can also find other important uses, e.g. it is considered suitable, when hydrophobic, to soak up a leaked oil film at sea.

The modification of the FIG. 5 machine-line shown in FIG. 10, is adapted to fill a particulate substance (104) into the channels formed between A and B. The filling is here shown very schematically. The powder (104) is taken from a hopper (111) and is administered by means of an adjustable vibrator (not shown). It falls into the fluted ply A at the upper side of the grooved lamination roller (10). At regular time intervals hopper (111) is filled up with the powder (104). The means for this are not shown. Other conventional systems for administering the powder (104) onto ply A on roller (10) may of course be chosen.

Roller (10) vibrates (means not shown) so that the powder is moved from the higher zones, i.e. those which become bonded zones when A meets B in the nip between (10) and (11), into the lower zones, which become the "channels".

Having left the laminating rollers (10), (11) and roller (13), the A+B-laminate with powder (104) in the channels moves toward the cog-roller (113)—its surface is shown in a detailed part-drawing—and its rubber-coated counter-roller (114) which together flatten and close the channels by making transverse seals. Roller (113) is vibrated in order to move powder away from the channel-parts which become flattened and sealed.

Both rollers (113) and (114) are heated to a temperature needed for the sealing, and since the laminate while entering these rollers still is near to temperature suitable for heatsealing due to the previous temperatures, this second heatseal process needs not cause a slowing down of the entire process.

For producing the product of FIG. 8, roller (113) and (114) can be omitted or taken out of function, and instead of administering powder into ply A, there can at the same place be laid a yarn into each flute. Each yarn is taken from a separate reel.

At some stage after rollers (10)/(11), ply B may be subjected to transverse shrinkage. It may be necessary to hold the laminate at the edges while B shrinks. This may be done by means of an ordinary center frame, but the latter should be set up to work inversely so that the width gradually is reduced instead of increased.

The process for making the transversely pre-fluted ply B, which appears from the flow-sheet FIG. 11 is generally analogous to the process which is described in connection with FIGS. 4 and 5, and the profiles of the grooved rollers can also be generally similar, except that for the process of FIG. 11 the grooves extend axially, while for the process of FIGS. 4 and 5 they are circular.

Step 1: Transversely oriented ply B, which was made tension-less at the lamination temperature and then again cooled, is longitudinally stretched in very narrow zones localized on the tips of a hot roller which has a profile similar to that of roller (8). The grooved counter-roller, which is cold, has a profile like that of roller (7).

Step 2: The warm, stretched "second attenuated zones" are cooled on a cold grooved roller which also has a profile like that of roller (7). Then to form "first attenuated zones" between the "second", ply A is longitudinally stretched between this cold roller and a warm grooved roller which also has a profile similar to that of roller (8). The stretching is localized to the tips of this roller. Similar to the registration in printing technology, step 2 is brought in registration with step 1 under use of a device which optically detects the stretched zones.

Step 3: The flutes are first formed in the grooves of a hot rubber coated roller with a profile similar to that of roller (10), e.g. Under use of compressed air, and are held in the grooves e.g. under use of vacuum, all as explained in connection with FIG. 12, and ply B is then laminated with ply A between the crests of this grooved rubber roller and a circularly grooved steel roller, which also is heated. Ply A has been preheated, and has already been supplied with flutes in the process shown in FIGS. 4 and 5.

There can be different after-treatments as explained in the foregoing, in particular after-shrinkage in one or both directions.

In FIG. 12, ply B which has been supplied first with the very narrow transverse second attenuated zones (101), and then with the somewhat wider, also transverse first attenuated zones (6), is directed into the grooves (115) of the heated lamination roller by means of compressed air from a row of nozzles of which one (116) is shown. By use of registration means, working on basis of optical detection of zones (6) or (101) it is arranged that the first attenuated zones (6) will cover the crests (118) of the grooved roller. The two sets of attenuated zones act as hinges so that even a quite heavy ply B may be bent and form the flutes. The latter are held in shape in the grooves under use of vacuum applied through channels (117) from the interior of the roller. Thus ply B is moved in flute shape to the nip (not shown) between the grooved roller and the circularly grooved counter-roller, where lamination takes place. One of the two rollers, preferably that which feeds B, is rubber coated. The vacuum in the grooves is adjusted so that ply A is held firmly when this is needed, but can be released where that is needed. There can also be a valve arrangement inside the grooved roller to eliminate the vacuum during the release.

It is noted that FIG. 12 also, with some modifications, can illustrate a method of making the first and/or second attenuated zones (8) and (101) transverse to the machine direction by a new kind of segmental stretching e.g. as an alternative to steps 1 and/or 2 in the flow-sheet FIG. 11. For this purpose the roller, which now acts in analogy to roller (8) in FIGS. 4 and 5 (but making transverse stretching zones) should be heated similar to roller (8) and have relatively "sharp" crests also like the latter (e.g. Radius of curvature 0.7 mm) in order to localize the stretching to material in contact with or close to the crests. Furthermore the simple administration of compressed air from nozzles (116) should be substituted by a "Hovercraft" air pillow system to set-up an air pressure of several bars, capable of stretching the ply over the crests of the roller. Under special circumstances, when a pressure difference below 1 atom is sufficient, it will also be possible to stretch the ply over the crests of the roller by vacuum-forming. The vacuum is applied through channels (117).

In FIG. 13, hole (106) represents one series of holes on one side, and hole (107) represents another series of holes on the other side of the laminate, and the two series of holes are mutually displaced, so that a flow of gaseous or liquid material entering from one side through holes (106) must divide out and follow channels formed by the two sets of flutes, before the flow can reach holes (107) and exit on the other side of the laminate. Hereby hydrophobic or-hydrophilic properties of the channel walls can be advantageously utilized as explained in the general part of this specification.

FIG. 13 is a simplified presentation, since it only shows two mutually displaced holes, and only 4 wavelengths total passageway from hole to hole, i.e. generally about 3-10 mm total passageway. In practice it is more, convenient to make "twin" or "triplet" holes, as this will be explained in connection with FIGS. 14 and 14a, and also create a somewhat longer total passageway. This embodiment of the invention presents an entirely new type of porosity, with high regularity, which can be expected to find several important applications.

FIGS. 14 and 14a are identical except for the orientation of the slightly protruding flat spikes, (205) in FIG. 14 and (202) in FIG. 14a. The metal parts (201) of the rollers including the spikes which are fixed, for instance screwed, into this part are heated to a temperature well beyond the melting range of the polymer material. The roller surface is covered by heat insulating material, here shown as small plates (203) which e.g. can be made from poly(tetrafluoroethylene) (Teflon trade mark). There is one such plate per spike, and each is fixed onto the metal surface by means of the spike. The edge of the flat spike protrudes less than 1 mm from the outer level of the DTFE plate, so that it can touch the flutes on one side of the laminate without penetrating to the outer side of the laminate.

The laminate is caused to follow the roller over a short distance at the same or almost the same velocity as the latter. There may be a very small difference between the velocities in order to widen the holes. In order to press the laminate towards the spikes, which cut and melt holes, and at the same time protect the ply, which should not become perforated in that process step, air jets are blown towards the laminate through holes in the pipes (204). The spikes (202) and (205) are arranged in a pattern of rows, both circumferentially and axially, and the holes (204) in the pipes correspond with each of the circumferential rows so that the air pressure and the cooling effect become highest where most needed.

The spikes in FIG. 14 can be of identical shape with those in FIG. 14a, namely wedge-formed with the shape which appears when the two figures are studies together. The sharp edge cuts perpendicular to the direction of the flutes in both cases, and the length of this edge can conveniently correspond to two or three times the wavelength of the flutes so that "twin" or "triplet" holes are formed.

Outside the area where the roller contacts the laminate, air of ambient temperature is blown out onto the PTFE platelets to keep their surface at a temperature below the melting range of the polymer material (the means are not shown).

EXAMPLE 1

A 2-ply laminate of ply A and ply B with A longitudinally and B transversely fluted and oriented was manufactured on a pilot unit constructed as shown in FIGS. 4 and 5. Both plies consisted of one coextruded, cold-stretched 0.037 mm thick film consisting of HDPE with a thin layer on one side consisting of an ethylene copolymer having a melting range between 95-105° C. This was used as lamination layer in the process. The cold-stretching was carried out near room temperature at a draw ratio about 3:1 and was followed by heat stabilisation, all by well-known means, and while the film had flat tubular form. The tube was longitudinally cut to form ply A.

Processes for continuous manufacture of transversely oriented film are well known and mentioned in the foregoing, but it would have caused practical complications for the inventor to have such film manufactured according to his specifications, and therefore short lengths of the ply A-film were heat-sealed together edge to edge to form a transversely oriented web.

All of the grooved rollers had the pitch 1.1000 mm at the temperature at which they actually were used, but due to the large temperature differences during the stretching/laminating process, the thermal expansion had to be taken into consideration when these rollers were machined at 20° C., see the table below. The biggest temperature difference between the rollers, as it appears from this table, was 85°, and this corresponds to an expansion of about 0.10 mm per 10 cm roller length, while the accumulated error in the fitting between adjacent rollers from end to end of the rollers must be maintained lower than 0.10 mm to obtain the needed registration.

The table below also indicates the radius of curvature (R) or the length of a land on the crest of the grooved rollers as seen in the axial section in FIG. 4 and indicated in mm.

|  | Roller No. | | | | | |
| --- | --- | --- | --- | --- | --- | --- |
|  | 6a | 7 | 8 | 9 | 10 | 11 |
| Crest | land | R | R | R | land | land |
| mm | 0.4 | 0.2 | 0.7 | 0.15 | 0.4 | 1.0 |
| Temp ° C. | 70 | 20 | 70 | 105 | 105 | 105 |
| Pitch mm | 1.0993 | 1.1000 | 1.0993 | 1.0988 | 1.0988 | 2.0 |

The roller (12) for preheating and stabilisation (shrinkage) of B was heated to 90° C.

It is of course not practically possible to achieve such a high accuracy in the pitch of rollers (6a) to (10) seen individually from groove to groove, but it is essential that errors in the pitch do not accumulate by more than 0.05 mm. This is best achieved when the surface parts are made from segments and accumulated errors are eliminated by fine grinding of the segment ends and/or thin shims (foils) are inserted between the segments. In the actual pilot machine the length of the grooved part of each roller surface was about 450 mm and was assembled from 3 segments. It is judged that in an industrial machine the rollers can be made in up to about 5 m length, but in that case the accuracy from end to end has to be checked with laser measurements and adjustments made as explained.

The main part of the transverse stretching, which is the basis for the flute formation in A and which forms the first attenuated zones—later the zones which become bases, not crests of the flutes in the laminate—took place by the intermeshing between rollers (7) and (8) and became localized to a zone on and nearby the crests of roller (8). This is because roller (8) was hot and had a relatively sharp crest, while roller (7) was cold and had a much rounder crest (higher radius of curvature R). It is relevant also in this connection that ply A was uniaxially oriented in the machine direction and therefore had a high tendency to "neck-down" and form sharply delimited attenuated zones when it was transversely stretched.

The function of roller (6a) was to preheat the zones which were to be stretched on the tips of roller (8). In this example the "land" on the crests of roller (6a) are wider than the diameter of the crests of roller (8). This has been chosen in order to counteract the pronounced tendency in the film to neck-down, in other words, to make the limits of the first attenuated zones smoother. In other cases e.g. when ply A has a pronounced transverse orientation and therefore no tendency to necking down by transverse stretching, the land on the crests of roller (6a) which preheats the film, should be no wider than the land on the crests of roller (8).

Between rollers (6a) and (7) there was set a slight but almost zero engagement to avoid wrinkles, but without stretching the films.

Having left the transverse stretching roller (8), ply A was taken over by transfer roller (9). This had the high temperature shown in order to help the shaping of flutes in the zones which had not been stretched. At this stage the first attenuated zones were still deeply curved, but when (A) was taken over by the flat 0.4 mm wide crests (lands) on the grooved laminating roller (10) the first attenuated zones were flattened almost over their entire width except at their boundaries where the thickness gradually increases. The rubber-coated counter-roller, was heated from its inside by circulating water like the other heated rollers, and furthermore was heated from outside with hot air to keep the surface at a temperature of 105° C.

Prior to the experimental run the axial positions of the grooved rollers were very carefully adjusted to each other, and so was the intermeshing between adjacent grooved rollers. The intermeshing between rollers (7) and (8) was set to make the depth of the fluting 0.40 mm, as measured in microscope on a cross-section of the finished laminate. As already mentioned, the engagement between rollers (6a) and (7) was set to almost zero. The engagement of roller (8) to roller (9) and of roller (9) to roller (10) was set to exactly zero. The pitch of the deeply grooved rollers (14a) and (14b) was 10 mm. Their intermeshment was set to allow maximum shrinkage of ply B in the direction perpendicular to the machine direction, without causing any folds or pleats in the final state of this ply.

Rollers (6a) to (10), roller (12) and rollers (14a and b) were all driven at the same circumferential velocity, while roller (11) was driven by roller (10) and the other rollers were idling.

By the heating of ply (A) on rollers (8), (9) and (10) it acquired a high tendency to longitudinal shrinkage but was kept tentered until it passed the nip between rollers (10) and (11) and thereby became spot-laminated to ply (B). Then while still on roller (10) it developed its shrinkage and caused ply (13) to buckle up, forming its flutes.

The idling take-off roller (13) had a heat insulating surface so that the laminate still to some extent was formable on this roller. The roller surface was slightly corrugated, namely in a waving which seen in axial section had sinus form with wavelength 10 mm and depth 1.0 mm. This essentially eliminated the tendency of the laminate to curl.

While leaving roller (13) under a low tension the laminate was air-cooled. Measurements showed that ply A had contracted 20% after the lamination step, and ply B has buckled up correspondingly. The height of these flutes was measured to be 0.5 mm.

EXAMPLE 2

The procedure of example 1 was repeated with the difference that the division of axial grooves on the rubber coated lamination roller is changed from 2.0 mm to 1.0 mm with the land being 0.5 mm. This also produces flutes in B by the shrinkage of A. The height of these flutes is measured to be 0.25 mm.

EXAMPLE 3

The film produced as explained in example 1 was air-heated to 115° C. while the edges parallel to ply A's flutes were fixed between clamps, which however were set up so that they allowed ply B freely to shrink. Hereby the wavelength in ply A was reduced to 0.8 mm.

EXAMPLE 4

The laminate of example 1 was subjected to the procedure explained in connection with FIGS. 14 and 14a, however since the two rollers for perforation were only about 400 mm long and constructed for short experimental runs its was possible to simplify this construction. The wedge formed spikes (202) and (205) were made as one part with the steel sleeve (201) of each roller. Furthermore the many Teflon plates were substituted by a simple coating with a 2-component epoxy binder. The edges of the wedge-formed spikes extended 0.2 mm beyond this coating. The length of this edge was 5 mm. The temperature of the edge was about 150° C. and the temperature on the surface of the epoxy cover about 120° C. The distance from a spike to each of its 4 neighbors was 40 mm, measured from edge-middle to edge-middle.

The laminate was first perforated on one side to form a first pattern of perforations, then in a second separate process on the other side to form a second pattern of perforations. During this second process it was manually controlled that the second pattern of perforations fitted correctly with the first pattern to give maximum displacement between the two patterns. (In practical production the second series of perforations should of course be carried out in line with the first series).

The laminate with mutually displaced patterns of perforations on its two sides was converted to a small bag and there was filled about 10 cm water into the bag, which was suspended in a set of frames holding the bottom straight horizontally and allowing the water to drop down.

The water continued to drop until its surface stood 20 mm over the bottom, then it stopped dropping. It can be concluded that the fine capillary channels in the laminate could withstand 20 mm water pressure due to their fineness and hydrophobic properties. It is noted that the laminate of my copending patent application WO-A-02102592 mentioned in the introduction, in which ply A is fluted and ply B flat, has been found to show similar properties when the flutes are similarly fine, the perforations are similarly arranged, and the material is similarly hydrophobic. However in that case the perforations in ply B (the flat ply) cannot be made in the same, very practical way.

EXAMPLE 5

This example illustrates use of shrinkage of longitudinally oriented ply A to produce a 2-ply A/B in which A is non-fluted and B is transversely fluted. The procedure is the same as in example 1 except for the important difference that rollers (6a), (7), (8), (9) and (10) are exchanged by smooth rollers (reference numbers here remain the same) and roller (6a) is supplied with a rubber counter-roller to prevent the film from slipping over it. The rubber-coated roller (11) is the same as in example 1, i.e. it is supplied with axial grooves of pitch 2.0 mm and land 1.0 mm. (In this case the same effect can be achieved when the rubber coated roller (11) is flat and the matching steel roller (10) is supplied with axial grooves of pitch 2.0 mm and land 1.0 mm).

Rollers (6a) and (7) are kept at room temperature while rollers (8), (9), (10) and (11) are controlled at the lamination temperature 105° C., and the temperature of roller (12) which preheats ply B and due to the pleats introduced by rollers 14a and b essentially eliminates its tendency to transverse shrinkage, is controlled at 90° C.

The composition of both plies, and the cold stretching prior to the "FIG. 5 process" is exactly as in example 1. Like in that example the transverse orientation in ply B is achieved by welding short lengths of longitudinally oriented film together.

Rollers (6a) to (10), roller (12) and rollers (14a and b) are all driven at the same circumferential velocity, while roller (11) is driven by roller (10) and the other rollers are idling.

By the heating of ply (A) on rollers (8), (9) and (10) it acquires a high tendency to longitudinal shrinkage, but since counter-rollers hold (A) firmly to rollers (6a) and (10) the shrinkage takes place after the lamination with ply B, and since the bonding is established along transverse linear areas, this shrinkage causes B to "buckle up" to flutes between the bonded areas. This also gives the laminate a tendency to curling but that tendency is essentially eliminated by roller (13) due to its slightly waved surface.

The final laminate consists of flat longitudinally oriented ply A and transversely fluted, transversely oriented ply B. The wavelength of the flutes is about 1.5 mm.

The invention claimed is:

1. A flexible laminate comprising a monofilm-formed or multifilm-formed flexible ply A, and a monofilm-formed or multifilm-formed flexible ply B, both comprising orientable thermoplastic polymer materials, in which the ply A has a fluted configuration and the ply B on a first side is adhesively bonded in bonding zones to crests on a first side of the ply A, where:
   (a) the ply B also has a fluted configuration, a flute direction of the ply B forms an angle from about 30° up to and including 90° to a flute direction of the ply A and the bonding zones being on crests of the first side of the ply B to produce spot bonds with the crests on the first side of the ply A,
   (b) the adhesive bonding is
      (i) directly between the ply A to the ply B and established through a lamination layer on the ply A and/or the ply B;
      (ii) established through a separate thin bonding film; or
      (iii) through a fibrous web adapted for bonding,
   (c) wavelengths of the flutes in the ply A and/or the ply B are no longer than 5 mm, and the wavelengths of the flutes in both the ply A and the ply B are less than 10 mm, and
   (d) the ply A is molecularly oriented in a direction parallel or substantially parallel to its flute direction as determined by shrinkage tests.

2. The laminate according to claim 1, wherein either a thickness of each of the plies is substantially the same in the bonding zones and non-bonding zones, or at least one of the plies exhibits first zones extending parallel to the flute direction, each bonding zone being substantially located within first attenuated zones whereby each first attenuated zone is understood as delimited by the positions where the thickness is an average between a minimum thickness of this ply within the first attenuated zones and a ply's maximum thickness within adjacent non-bonding zones.

3. The laminate according to claim 1, wherein the flute wavelength in each of the two plies is no more than 4 mm.

4. The laminate according to claim 1, wherein each of the two plies a curved length of a flute is on average at least 5% longer than the linear wavelength, the curved length being understood as the length of a curve through a cross section of a full flute wave including the bonding zone which curve lies in the middle between the two surfaces of the ply.

5. The laminate according to claim 4, wherein a width of each bonding zone in at least one of the two plies is no less than 15% of the flute wavelength.

6. The laminate according to claim 1, wherein the flutes in at least one of the two plies are evenly formed and extend in a substantially rectilinear shape.

7. The laminate according to claim 1, wherein the flutes in at least one of the two plies, while extending substantially along one direction, are curved, or zig-zagged and/or branched.

8. The laminate according to claim 1, wherein the flutes in at least one of the two plies, while extending substantially along one direction, are differently shaped in a pattern which gives a visual effect showing a name, text, logo or similar visual effect.

9. The laminate according to claim 1, wherein at least one of the two plies has a metallic or iridescent gloss, or the two plies have different colors.

10. The laminate according to claim 1, wherein the flute direction of the ply A is substantially perpendicular to the flute direction of the ply B.

11. The laminate according to claim 10, wherein one of the two flute directions essentially coincide with a machine direction of lamination.

12. The laminate according to claim 2, wherein the ply B is molecularly oriented and a ply B's orientation outside its first attenuated zones, if such zones are present, is higher than a ply A's average orientation in the same direction outside its first attenuated zones, if such zones are present, the two orientations being observable by shrinkage tests.

13. The laminate according to claim 2, wherein a yield tension in the ply A in a direction parallel to its flute direction and/or a yield tension in the ply B in a direction parallel to its flute direction, both referring to the cross-section of the respective ply and determined in non-bonded narrow strips at an extension velocity of 500% min$^{-1}$, is no less than 30 MPa.

14. The laminate according to claim 1, wherein the ply B has a lower coefficient of elasticity than the ply A, both as measured in the direction perpendicular to the flute direction of the ply A.

15. The laminate according to claim 2, wherein the choice of material for the ply B and of depth of the ply A's fluting is such that by stretching of the laminate perpendicular to the direction of the ply A's fluting up to the point where the ply A's waving has disappeared, the ply B still has not undergone any significant plastic deformation.

16. The laminate according to claim 2, wherein the ply B, outside its first attenuated zones if such zones are present, has a main direction of molecular orientation parallel to the direction of the flutes or in a direction close to the latter as provable by shrinkage tests.

17. The laminate according to claim 2, wherein the ply A is composed of several films, and the main direction of molecular orientation, is the resultant of different monoaxial or biaxial orientations in the films optionally mutually differently directed.

18. The laminate according to claim 16, wherein the ply B is composed of several films, and the main direction of orientation is the resultant of different monoaxial or biaxial orientations in the films optionally mutually differently directed.

19. The laminate according to claim 2, wherein the first attenuated zones are present in at least one of the two plies and if the first attenuated zones extend in their transverse direction beyond corresponding bonding zones into adjacent non-bonding zones, the extensions within each non-bonding zone are limited to a total width which leaves more than half of a width of the non-bonding zone as not belonging to any first attenuated zone, these widths being the distances measured along the curved surfaces.

20. The laminate according to claim 2, wherein the first attenuated zones are present in at least one of the plies and in which the bonding zones are substantially coincident with the first attenuated zones.

21. The laminate according to claim 2, wherein the first attenuated zones are present at least in one of the two plies and characterized by second solid-state-attenuated zones between each pair of adjacent first attenuated zones, the second attenuated zones being narrower than the first attenuated zones and located on non-bonded crests of the respective ply.

22. The laminate according to claim 2, wherein at least one of the two plies exhibits solid-state-attenuated zones wherein the first attenuated zones of the ply are attenuated so that the minimum thickness in such zone is less than 75% of the maximum thickness of the ply in the non-bonded zones.

23. The laminate according to claim 1, wherein the ply A and the ply B comprise a material which is orientable at room temperature.

24. The laminate according to claim 1, wherein the spot bonds between the plies A and B is effected through a lower melting surface layer co-extruded on at least one of the plies, formed in a coextrusion process.

25. The laminate according to claim 1, wherein at least one of the plies comprises a barrier film designed for protection against oxygen or other gaseous materials.

26. The laminate according to claim 1, wherein at least some of the flutes in one or both plies are flattened at intervals and bonded across each ones entire width at the flattened locations to make two arrays of flutes to form closed pockets.

27. The laminate according to claim 26, wherein the flattened portions of a number of mutually adjacent flutes or of all flutes are in an array.

28. The laminate according to claim 1, wherein by the choice of polymer material or by an incorporated filler or by orientation, a coefficient of elasticity E in at least one of the plies, measured in the non-bonding zones of the ply in the direction parallel to the flute, as an average over the non-bonding zones is no less than 700 MPa.

29. The laminate according to claim 1, wherein both the ply A and the ply B are supplied with a multitude of perforations, whereby the perforations do not reach into the spot bonds, and the perforations in the ply A are displaced from the perforations in the ply B so as to cause gas or liquid when passing through the laminate, to run a distance through the flutes substantially parallel to the main surfaces of the laminate; channels formed by the flutes may be closed to form pockets.

30. The laminate according to claim 29, further comprising portions of the fibrous web protruding from borders of the perforations of at least on one surface of the laminate.

31. The laminate according to claim 3, wherein the flute wavelength in each of the two plies is no more than 3 mm.

32. The laminate according to claim 3, wherein the flute wavelength in each of the two plies is no more than 2 mm.

33. The laminate according to claim 4, wherein each of the two plies the curved length of a flute is on average at least 10% longer than the linear wavelength.

34. The laminate according to claim 5, wherein the width of each bonding zone in at least one of the two plies is no less than 20% of the flute wavelength.

35. The laminate according to claim 5, wherein the width of each bonding zone in at least one of the two plies is no less than 30% of the flute wavelength.

36. The laminate according to claim 13, wherein the yield tension in the ply A in a direction parallel to its flute direction and/or the yield tension in the ply B in a direction parallel to its flute direction, both referring to the cross-section of the respective ply and determined in non-bonded narrow strips at an extension velocity of 500% min$^{-1}$, is no less than 50 MPa.

37. The laminate according to claim 13, wherein the yield tension in the ply A in a direction parallel to its flute direction and/or the yield tension in the ply B in a direction parallel to its flute direction, both referring to the cross-section of the respective ply and determined in non-bonded narrow strips at an extension velocity of 500% min$^{-1}$, is no less than 75 MPa.

38. The laminate according to claim 15, wherein the ply B comprises a thermoplastic elastomer.

39. The laminate according to claim 19, wherein the total width of the extensions leaves no less than 70% of the width of the non-bonding zone as not belonging to any first attenuated zone.

40. The laminate according to claim 21, wherein the first attenuated zones of the ply are attenuated so that the minimum thickness in such zone is less than 50% of that maximum thickness.

41. The laminate according to claim 21, wherein the first attenuated zones of the ply are attenuated so that the minimum thickness in such zone is less than 30% of that maximum thickness.

42. The laminate according to claim 22, wherein the ply A and the ply B comprise a polyolefin.

43. The laminate according of claim 28, wherein the average over the non-bonding zone is no less than 1000 MPa.

44. The laminate according to claim 1, wherein at least some of the channels formed by the flutes in the ply A and the ply B, which channels may be closed to form pockets, contain a filling material in particulate, fibrous, filament or liquid form.

45. The laminate according to claim 44, wherein the material is a preservative for goods intended to become packed in or protected by the laminate, a corrosion inhibitor or a fire extinguishing agent.

46. The laminate according to claim 45, wherein the laminate further includes micro-perforations established in the flutes, which enhance the effect of the preservative.

47. The laminate according to claim 29, wherein the channels or pockets contain filling material adapted to act as a filter material by holding back suspended particles from a fluid passing through the channels or pockets or is an absorbent or ion-exchanger capable of absorbing or ion-exchanging matter dissolved in such fluid, the filler optionally being fibre-formed or yarn-formed.

48. The laminate according to claim 47, wherein by choice of hydrophobic properties of at least the inner surfaces of the channels or pockets formed by the flutes and by selected small spacing of said channels or pockets, and choice of the distances between the mutually displaced perforations in the ply A and the ply B, there is achieved a desirable balance between the pressure needed to allow water through the laminate and the laminate's capability to allow air and vapour to pass therethrough.

49. The laminate according to claim 48, used as a sanitary backsheet, on a diaper or as a sheet for covering a patient during surgery.

50. The laminate according to claim 48, used for insulation of buildings.

51. The laminate according to claim 29, used as a geotextile which allows water to pass but holds fine particles back.

52. A bag made from the laminate according to claim 1, wherein the flutes on one of the two major surfaces of the bag are substantially perpendicular to the flutes on the other major surface of the bag.

53. The laminate according to claim 45, wherein the preservative is selected from the group consisting of an oxygen scavenger, ethylene scavenger, and a biocide.

\* \* \* \* \*